July 12, 1966 J. D. CANTONI ETAL 3,260,291
APPARATUS FOR PITTING DRUPACEOUS FRUIT
Filed March 18, 1964 14 Sheets-Sheet 1

INVENTORS
JOHN D. CANTONI
ALFRED W. GERRANS
ROBERT W. SELLECK
BY Mellin and Hanscom
ATTORNEYS INVENTORS
JOHN D. CANTONI
ALFRED W. GERRANS
ROBERT W. SELLECK
BY Mellin and Hanson
ATTORNEYS

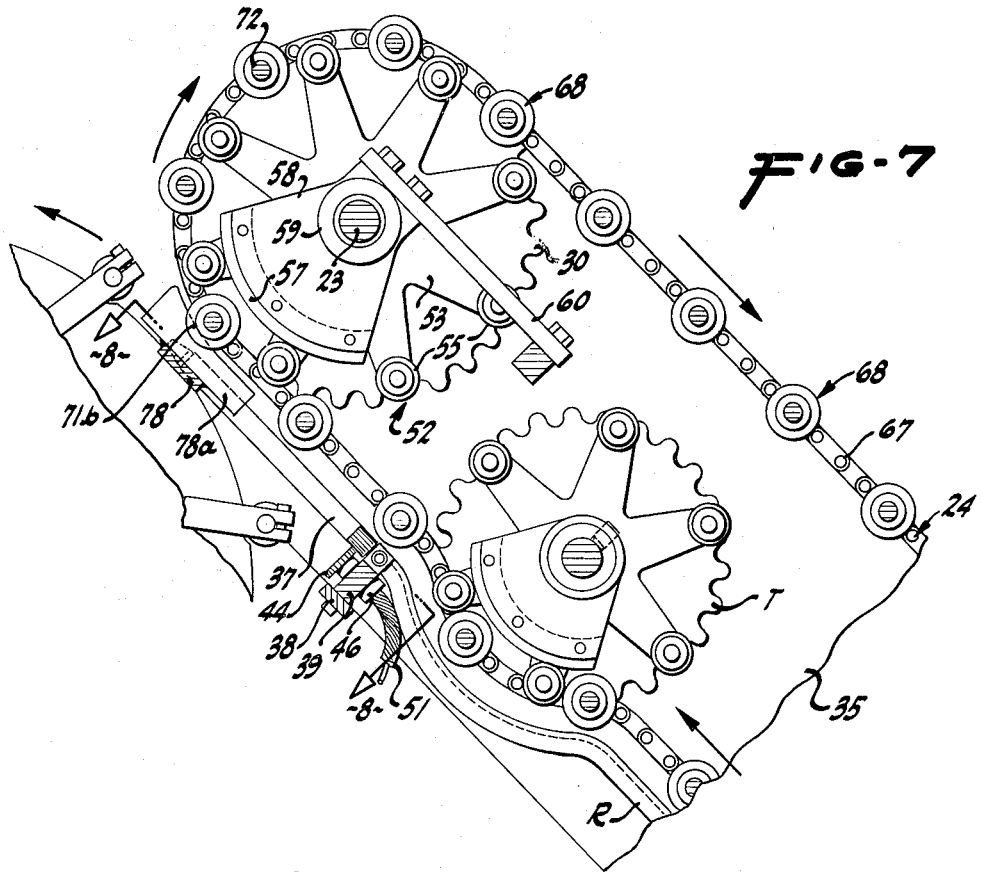
FIG-7
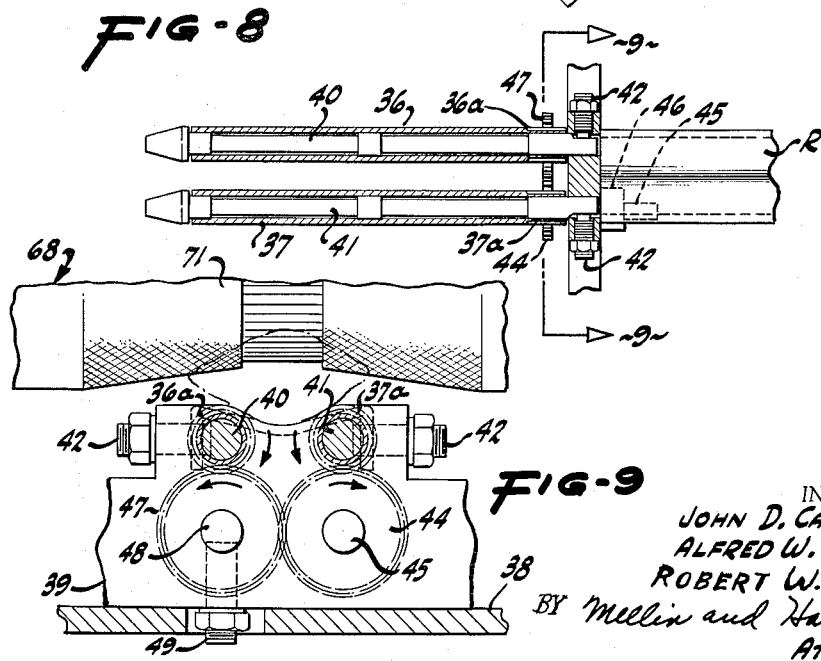
FIG-8
FIG-9
INVENTORS
JOHN D. CANTONI
ALFRED W. GERRANS
ROBERT W. SELLECK
BY Mellin and Hanscom
ATTORNEYS

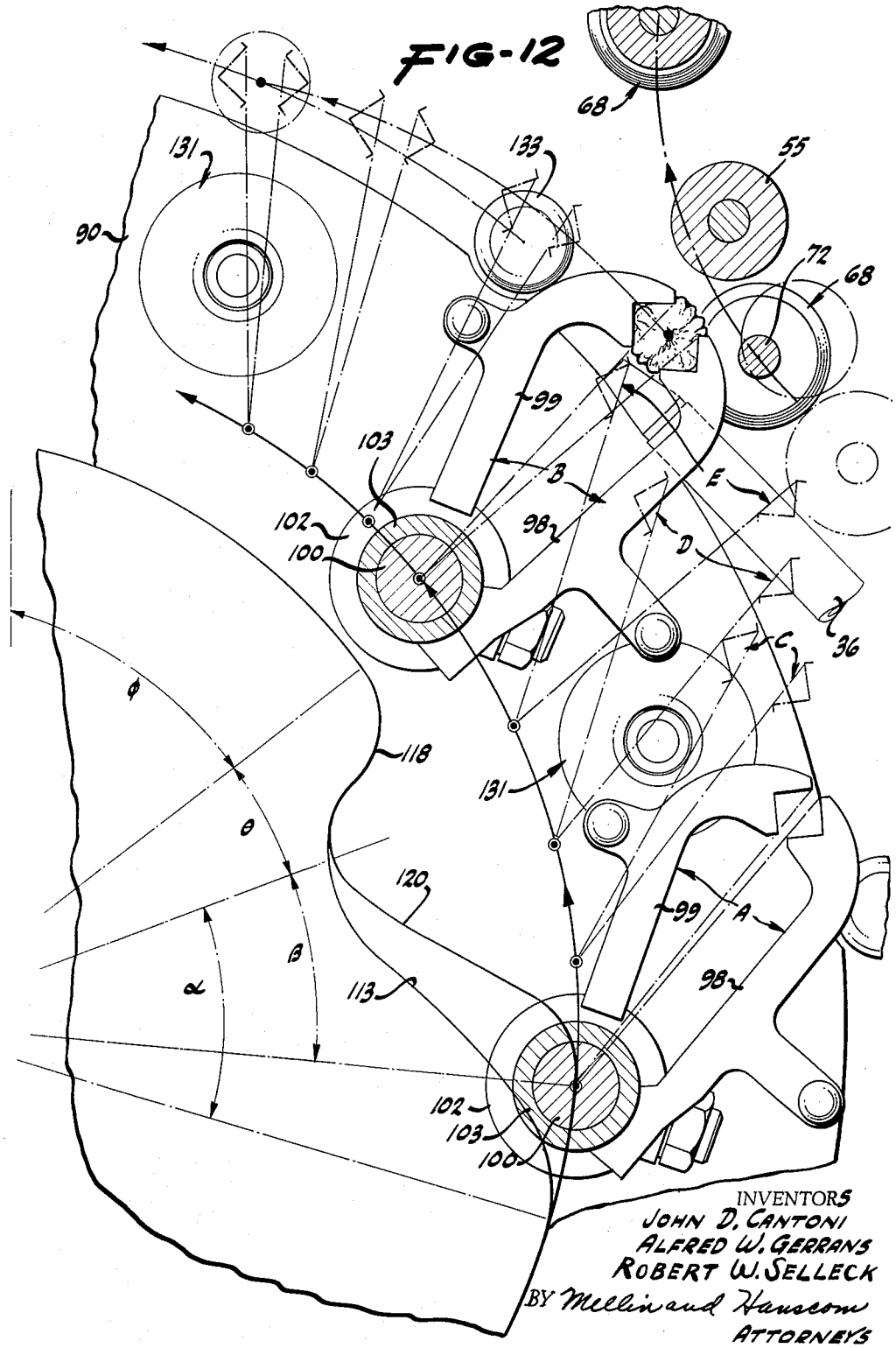

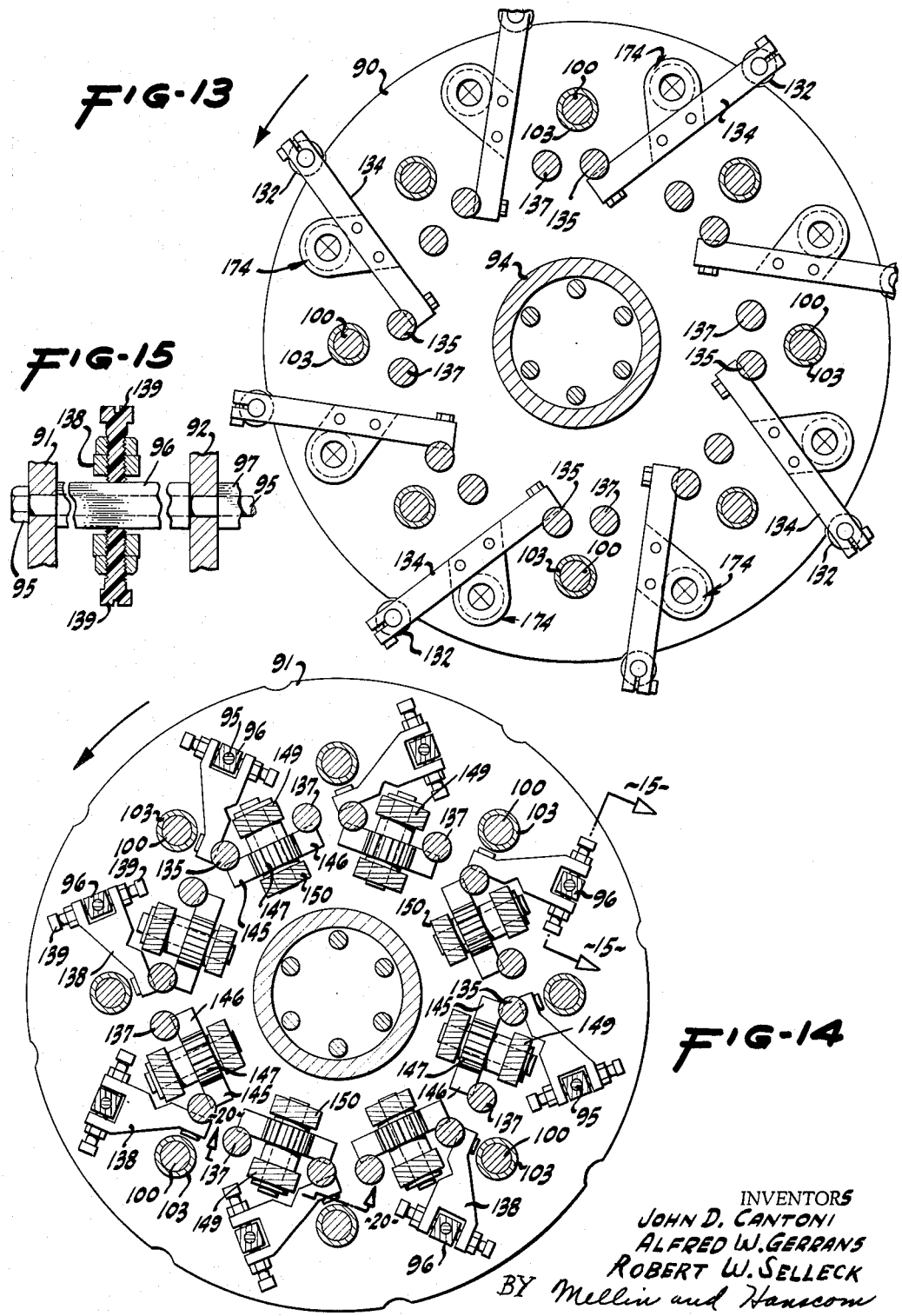

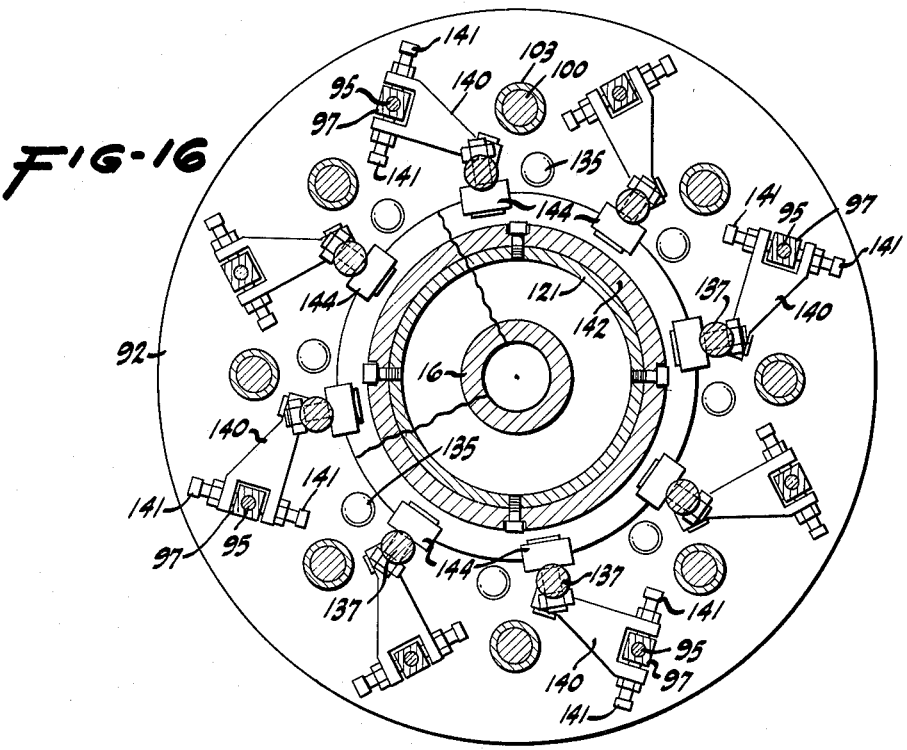
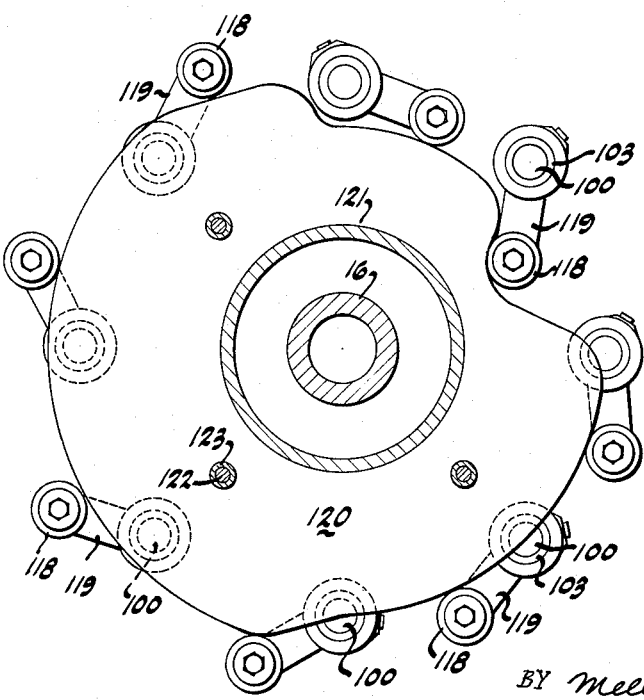

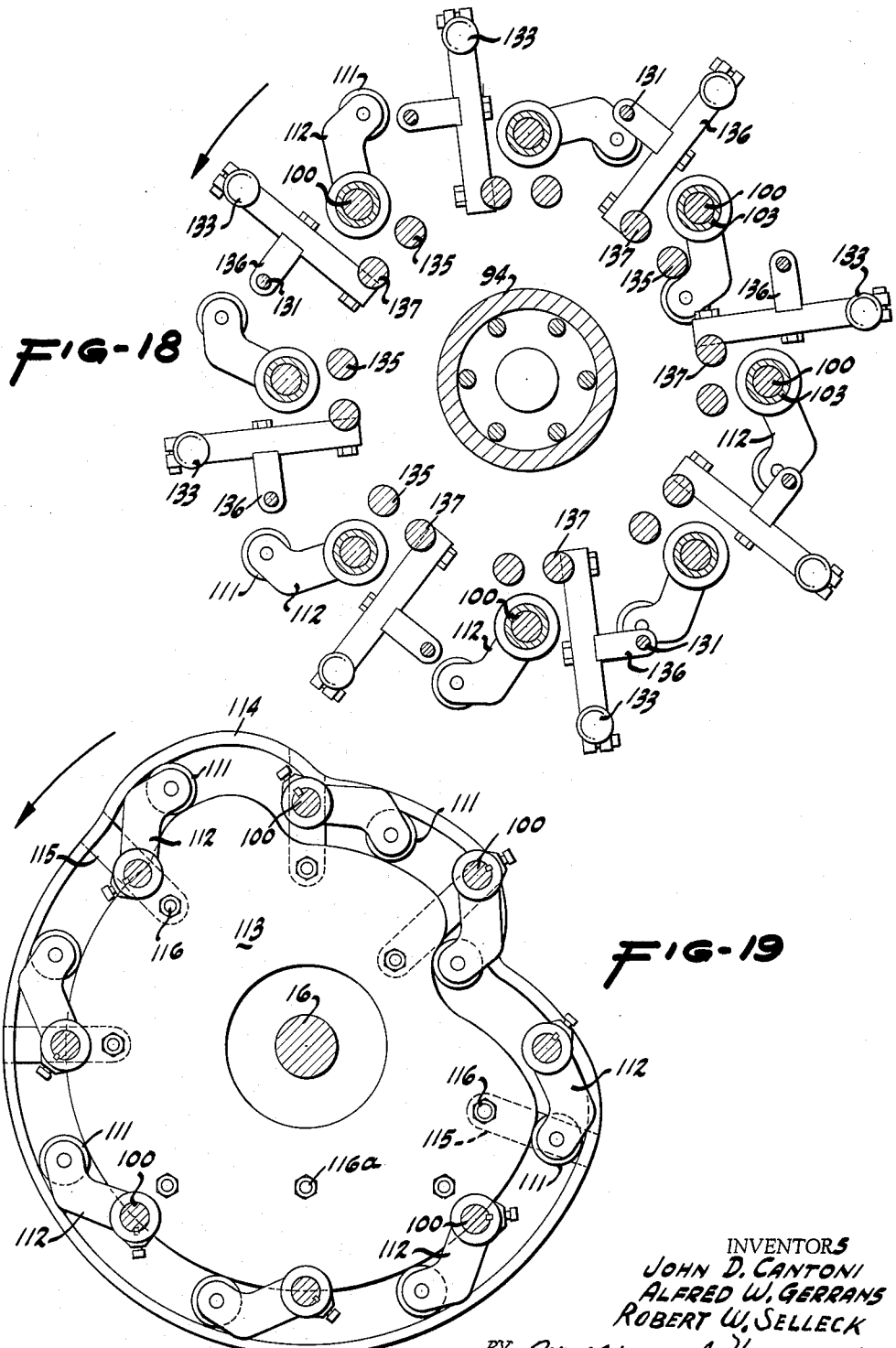

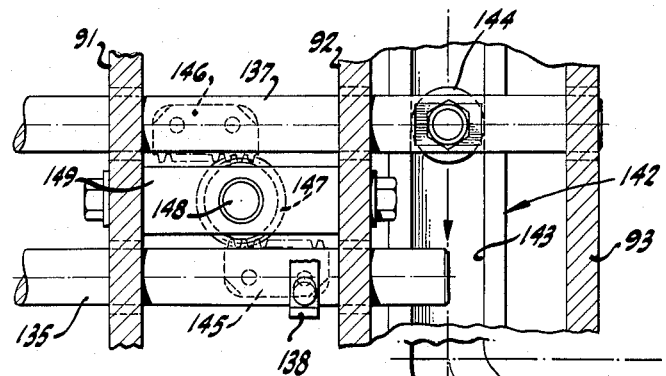
FIG-20
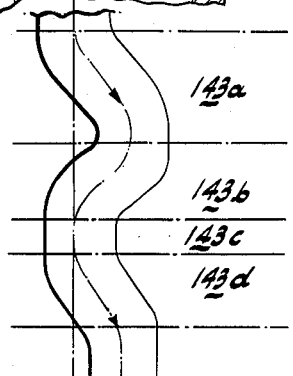
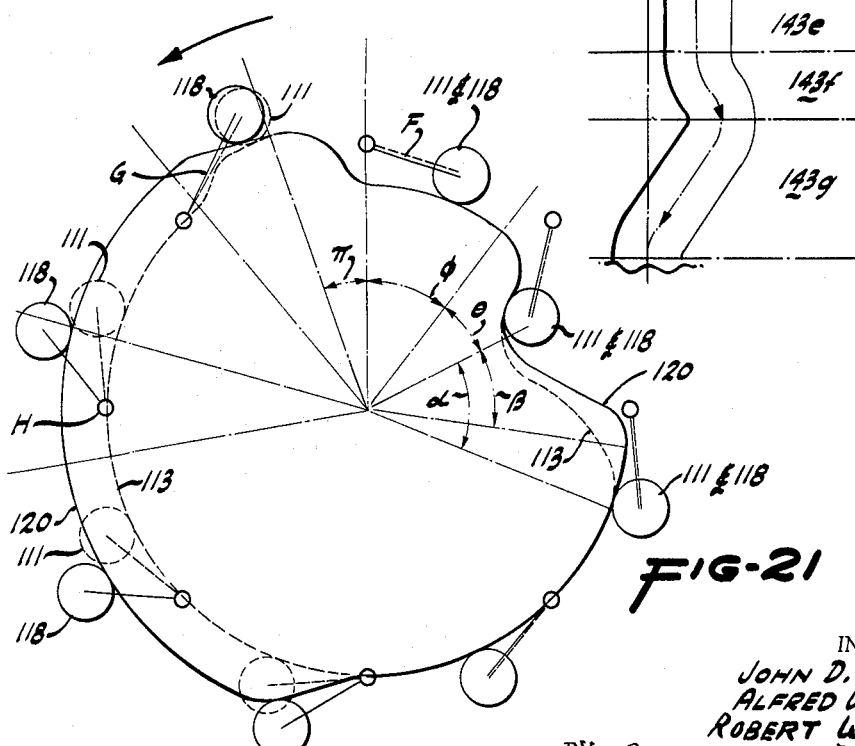
FIG-21
INVENTORS
JOHN D. CANTONI
ALFRED W. GERRANS
ROBERT W. SELLECK
BY Mellin and Hanscom
ATTORNEYS July 12, 1966  J. D. CANTONI ETAL  3,260,291
APPARATUS FOR PITTING DRUPACEOUS FRUIT
Filed March 18, 1964  14 Sheets-Sheet 11
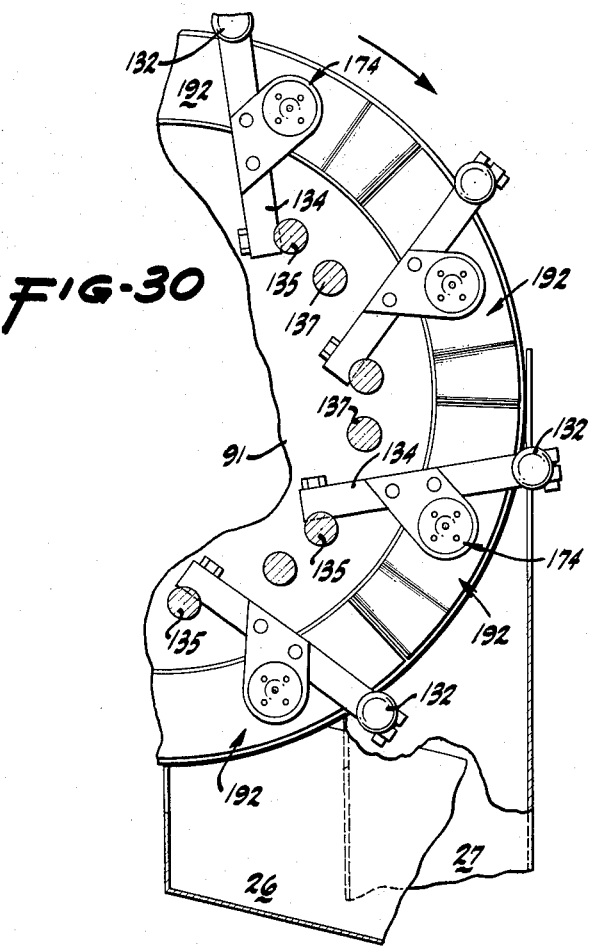
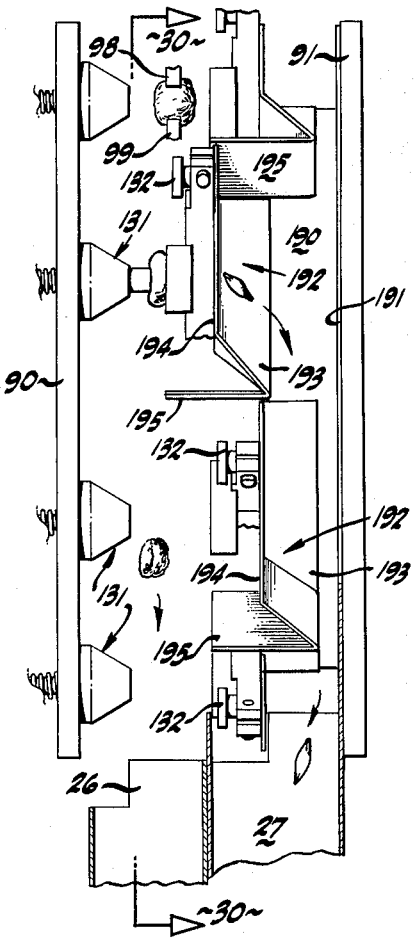
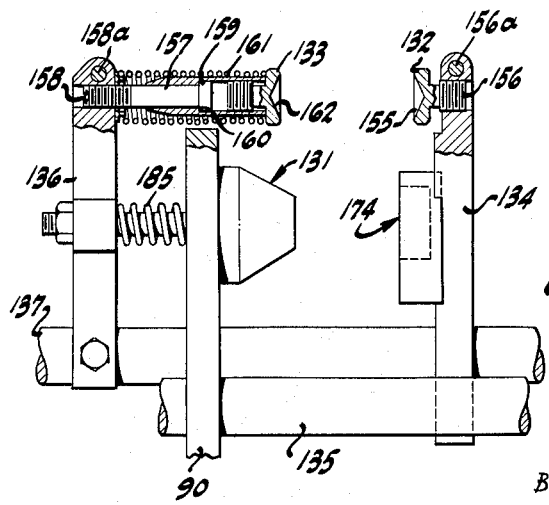
INVENTORS
JOHN D. CANTONI
ALFRED W. GERRANS
ROBERT W. SELLECK
BY Mellin and Hanscom
ATTORNEYS July 12, 1966 J. D. CANTONI ETAL 3,260,291
APPARATUS FOR PITTING DRUPACEOUS FRUIT
Filed March 18, 1964 14 Sheets-Sheet 12
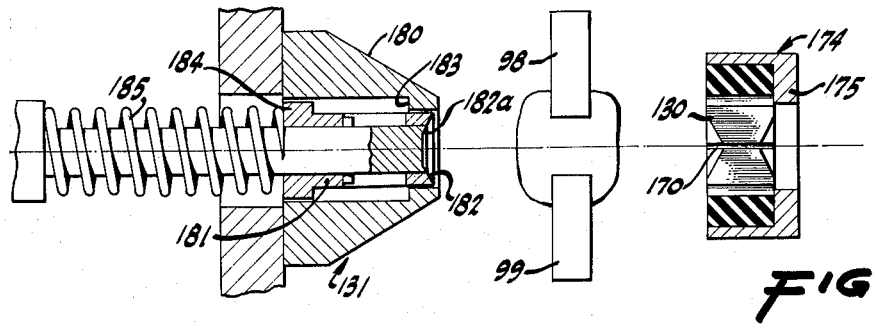
FIG-24
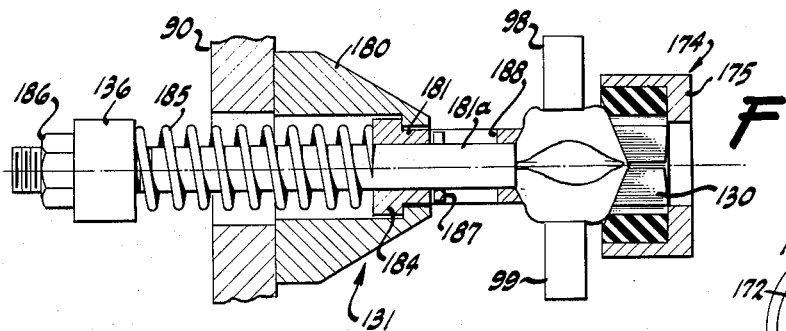
FIG-25
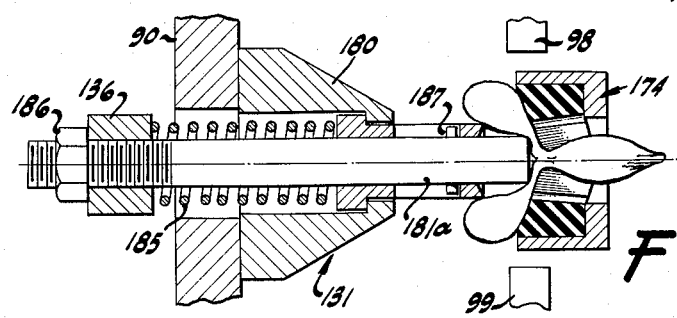
FIG-23
FIG-26
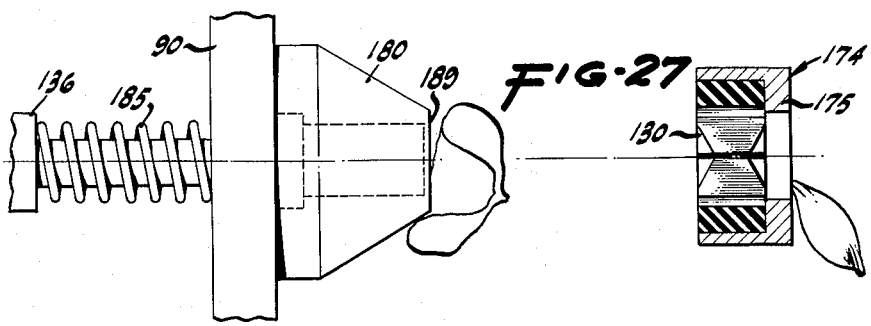
FIG-27
FIG-28
INVENTORS
JOHN D. CANTONI
ALFRED W. GERRANS
ROBERT W. SELLECK
BY Mellin and Hanscom
ATTORNEYS July 12, 1966  J. D. CANTONI ETAL  3,260,291
APPARATUS FOR PITTING DRUPACEOUS FRUIT
Filed March 18, 1964  14 Sheets-Sheet 14
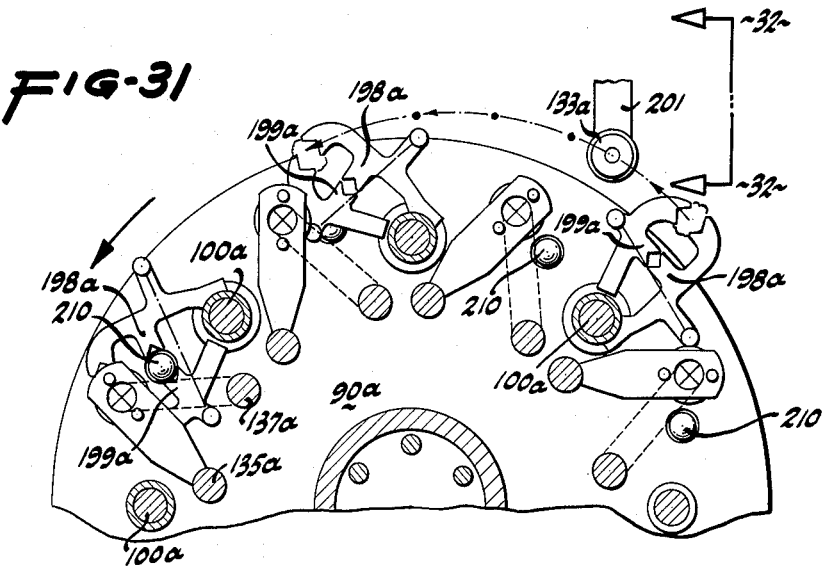
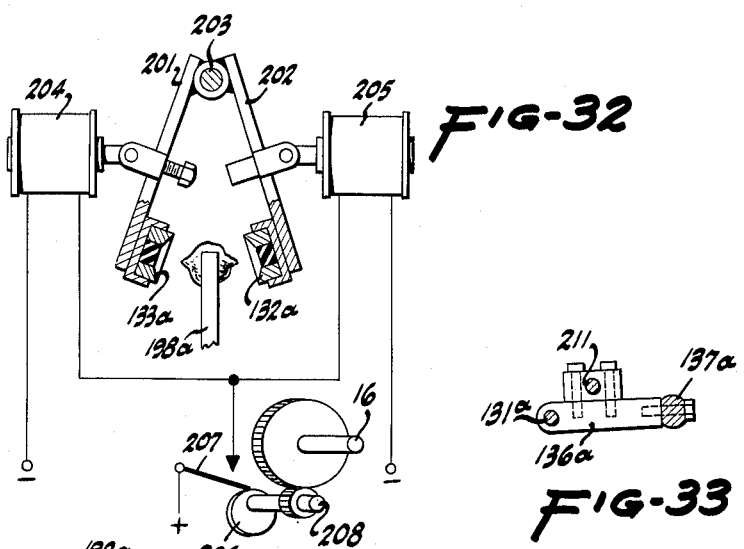
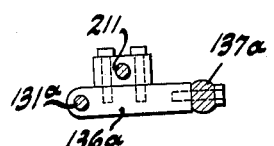
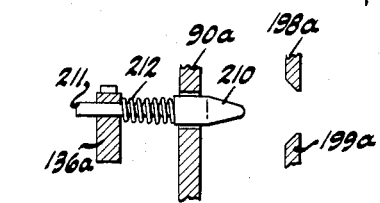
INVENTORS
JOHN D. CANTONI
ALFRED W. GERRANS
ROBERT W. SELLECK
BY Mellin and Hansson
ATTORNEYS United States Patent Office
3,260,291
Patented July 12, 1966

3,260,291
APPARATUS FOR PITTING DRUPACEOUS FRUIT
John D. Cantoni, Alfred W. Gerrans, and Robert W. Selleck, San Jose, Calif., assignors to Sunsweet Growers, Inc., San Jose, Calif., a corporation of California
Filed Mar. 18, 1964, Ser. No. 352,814
22 Claims. (Cl. 146—17)

This invention relates to fruit handling machinery and more particularly involves apparatus for pitting drupaceous fruit.

Although many forms of machinery and methods are known in connection with the pitting of drupaceous fruit, the present invention is particularly concerned with the processing of dried prunes, which present special problems because of their irregular shape and tendency to become sticky when heated or moistened. A machine capable of pitting prunes, and the most pertinent prior art known to applicants at this time, is the fruit handling machinery disclosed in their co-pending United States application Serial No. 271,793, filed April 9, 1963. Although many features of that invention are also embodied in the present application and invention, various unobvious changes and improvements have been made in the method of pitting and apparatus used to form a dried depitted prune having a pocket formed in one end of its pit axis. Such a product is of particular value in making hors d'oeuvres and fruit salads; and the novel methods and apparatus described herein are of great importance in forming a depitted prune having its flesh unbroken except for a pit removal opening at one end of its pit axis.

As with the machine described in applicants' co-pending application, the present invention comprises a unitary machine structure capable of receiving dried, drupaceous fruit in bulk quantity, separating a single piece of fruit from the bulk, shaping the fruit to position the pit thereof within its flesh, and orienting the fruit relative to a pitting die and plunger. Unlike the first machine, however, this invention teaches a novel pitting turret including pairs of pick-up fingers that grip a piece of fruit while it is supported upon a pair of spaced aligning rollers. In addition, a novel roller conveyor is employed, permitting one of a pair of fingers to be moved in back of a supported piece of fruit. Other structural differences will become evident.

Although there are many objects to the invention disclosed herein, it is one object to provide an apparatus for aligning, transferring and pitting drupaceous fruit, especially a machine suitable for use in the pitting of prunes.

Another object is to provide apparatus of the kind described including a pair of spaced support rollers for centering a piece of fruit relative to a moving pair of fruit engaging pickup fingers.

Another object is to provide an apparatus of the kind described and having a roller conveyor including a chain of rollers, each roller comprising a pair of axially spaced contacts and an intermediate axially retractible contact member, together with means for retracting the contact member of each roller as it approaches a point of fruit transfer, permitting a pick-up finger to be moved between spaced supporting surfaces and in back of a piece of fruit resting against the axially spaced contacts associated with the retracted intermediate member.

Another object of the invention is to provide an apparatus of the kind described including a pitting plunger, a complementary resilient pitting die and means for imparting limited relative movement of said die and plunger to compress a supported piece of fruit therebetween and force the greater portion but less than the whole pit of said fruit through the die, thereby forcing the pit through the prune flesh from one side without breaking the surface contacted by said plunger.

It is another object to provide apparatus of the kind described including a pitting plunger comprised of an outer plunger sleeve and an inner plunger rod for holding a piece of fruit against a pitting die and then forcing the pit of the fruit through the die without rupturing the compacted surface of the fruit.

Another object is to provide a pitting apparatus of the kind described including a pitting plunger having an outer plunger sleeve and an inner plunger rod with an adjustable bias disposed intermediate the sleeve and rod that determines the amount of pressure used for gripping the fruit while the rod is depitting the fruit.

It is another object of the invention to provide a pitting apparatus of the kind described including a pitting plunger comprising a plunger sleeve having a bevelled fruit contact surface for initially engaging the first to be pitted and an inner movable rod that may be moved into engagement with the fruit to force the pit therefrom after a predetermined pressure is applied to the pressure sleeve for holding the fruit in a pitting position.

Another object is to provide a pitting apparatus of the kind described including complementary pitting plunger and die members, each mounted for simultaneous movement to converge upon the ends of a gripped piece of fruit and including an actuating means comprising a pair of parallel support rods that are reciprocated by a common control cam and cam follower.

A further object is to provide a pitting apparatus of the kind described including a pitting die formed with dished surfaces on both sides thereof and having an expandable center opening with edges that taper inwardly toward the center of the die.

Another object is to provide a pitting die for pitting drupaceous fruit and comprising a number of convergent wedge-shaped sections, each section having a center apex adjacent the center apieces of other sections.

A still further object of the invention is to provide a pitting die for drupaceous fruit having a die opening that may be repeatedly flexed without rupturing the die and, more particularly, formed with dished surfaces on both sides thereof, a small opening through the die being centered relative to said surfaces, a number of other openings arranged symmetrically around the said small opening and at equal radial distances therefrom, and radial cuts extending between the small openings, and the other openings, thereby defining a number of convergent wedge-shaped sections, each section capable of separate and independent flexure relative to other sections.

Another object of the invention is to provide an apparatus for pitting drupaceous fruit of the kind described including a pair of pivotally mounted fingers and an actuating means therefor, said means moving the fingers in a continuous cycle of operation to pick up a single piece of fruit from a receiving staiton and position said fruit relative to convergent pitting plunger and die members.

Another object is to provide a pitting apparatus of the kind described including a pair of gripping fingers pivotally mounted upon a common axis and an actuating means therefor including cam controls, one for pivoting one finger relative to the other for picking up and releasing a piece of fruit, and the other cam control for moving both fingers between a fruit receiving station and a pitting station.

It is a further object of this invention to provide a pitting apparatus of the kind described including movable plunger and pitting die members and a cyclical actuating means therefor to grip the pit ends of a piece of fruit held by a pair of gripping fingers, maintain the plunger and die in spaced gripping relation until the fingers are moved apart, axially move said plunger and die to pit the fruit and then retract them to their starting positions.

Another object is to provide a pitting apparatus of the kind described including a means for striking the ends of the fruit preparatory to pitting to place the ends of its pit near the surface of its flesh.

A still further object of the invention is to provide a pitting apparatus including means for aligning a piece of fruit relative to a pitting die and its complementary plunger independently of small variations of the fruit's size or shape.

Another object is to provide an apparatus for pitting drupaceous fruit comprising a turret arrangement of fruit engaging fingers and a plurality of pitting plungers and pitting dies, one plunger and die being associated with a pair of fingers and movable toward each other for pitting one piece of fruit each complete revolution of the turret. In addition, it is contemplated that a turret of this kind may be constructed with a pair of clamping heads and including an actuating means for moving the heads and striking both ends of a prune prior to pitting. The clamping heads are preferably formed with a recess and having a cushioned surface engageable with the ends of the prune. Moreover, a pair of clamping heads may be provided for each pair of fruit engaging fingers, each pair of heads being reciprocally supported with a pitting plunger and a pitting die, respectively, and operated by the same means as is used for cyclically operating its associated pitting plunger and die.

A still further object of the invention is to provide methods for pitting prunes and separating the pits from the prune flesh with minimum rupturing. More specifically, the methods contemplate forcing a prune against a resilient die until the greater portion but less than the whole pit is forced through the die. The trailing end of the prune pit is then squeezed transversely of its pit axis to force the pit onward through the die while pulling the pit away from its flesh. The practice of such a method is dependent upon a proper alignment of the pit axis of the prune relative to the opening of a pitting die, and the operation is greatly enhanced by massaging the outer surface of the prune to center its pit within the flesh and loosen connecting fibers. The step of aligning a prune pit relative to the opening of a pitting die may be implemented by initially striking the end of the prune to place the pit nearer to the surface of its flesh.

A still further object of the invention is to provide a new article of manufacture and, more particularly, a dried, depitted prune having great utility and advantage in the preparation of an hors d'ouvre or fruit salad.

Other objects of this invention will become apparent in view of the following detailed description and the accompanying drawings.

In the drawings forming a part of this application and in which like parts are identified by like reference numerals throughout the same, FIG. 1 is a side elevation showing a fruit orienting, shaping and pitting machine embodying the present invention;

FIG. 7 is a side elevation of the hold-down roller turret and spaced support rollers viewed along line 7—7 of FIG. 4;

FIG. 8 is a plan view of the spaced support rollers as viewed on line 8—8 of FIG. 7;

FIG. 9 is a section taken on line 9—9 of FIG. 8;

FIG. 10 is an enlarged detail of a pair of complementary gripping fingers and a cross-section of the support shaft taken on line 3—3 of FIG. 2;

FIG. 11 is a section of a finger support shaft taken on line 11—11 of FIG. 2;

FIG. 12 is an operational view showing various positions of a pair of pick-up fingers as they are moved from a position beneath the spaced support rollers to a position for engaging an oriented piece of fruit;

FIG. 13 is a transverse section taken on line 13—13 of FIG. 2;

FIG. 14 is a transverse section taken on line 14—14 of FIG. 2;

FIG. 15 is a section taken on line 15—15 of FIG. 14;

FIG. 16 is a transverse section taken on line 16—16 of FIG. 2;

FIG. 17 is an elevation of the secondary finger control cam and a transverse section of the pitting turret shaft, taken on line 17—17 of FIG. 2;

FIG. 18 is a transverse section of the pitting turret taken on line 18—18 of FIG. 2;

FIG. 19 is an elevation of the primary finger control cam and a transverse section of the pitting turret, taken on the broken line 19—19 of FIG. 2;

FIG. 20 is an enlarged section taken on line 20—20 of FIG. 14, and further showing a development of the cam surface that controls actuating movement of the pitting plungers, dies and clamping heads;

FIG. 21 is a diagrammatic view showing superimposed profiles of the primary and secondary control cams with their respective cam followers;

FIG. 22 is an enlarged view of the clamping heads and actuating means shown in FIG. 2;

FIG. 23 is a front elevation of a pitting die;

FIGS. 24 through 27 are detail views of the pitting plunger and die illustrating various positions of a single cycle of operation with relationship to an associated pair of gripping fingers;

FIG. 28 is a perspective view of a dried, depitted prune formed by the pitting machine shown and the method employed;

FIG. 29 is an enlarged detail and elevation of a portion of the pitting turret as viewed in FIG. 2 but with each of the pitting plungers and dies mounted thereto, and only parts in the foreground being shown;

FIG. 30 is a portion of a transverse section of the pitting turret as viewed on line 30—30 of FIG. 29;

FIG. 31 is a portion of a transverse section of a pitting turret such as first described but modified to provide an alternate means for clamping each prune at its ends before pitting, and further including means for precisely aligning each pair of gripping fingers relative to its associated pitting plunger and pitting die independently of the size of fruit held by the fingers FIG. 32 is an elevation of the clamping means employed with the turret shown in FIG. 31 as viewed on line 32—32 thereof; and FIGS. 33–35 illustrate various details for mounting a locating pin to each plunger support arm, said pin being positioned for engaging complementary surfaces of an associated pair of gripping fingers immediately prior to pitting.

General description of apparatus

Figure 1:
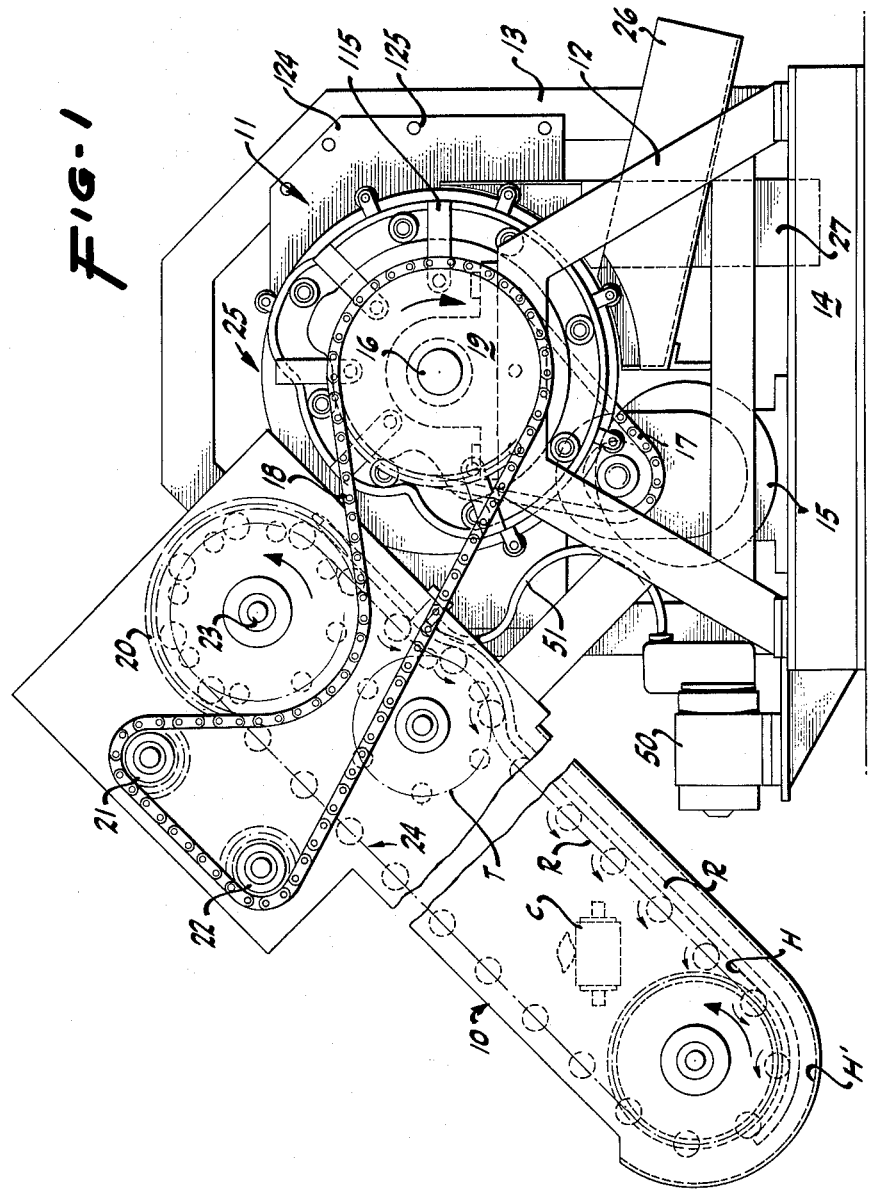

Referring to FIG. 1, there is shown an apparatus comprising a fruit orienting and shaping device 10 having a roller conveyor for moving single pieces of drupaceous fruit into a position where they are picked up by a pair of fingers that form part of a pitting apparatus 11. Both the fruit orienting and shaping device 10 and pitting apparatus 11 are supported by a framework comprising end frames 12 and 13 and a platform 14, and both are driven by a motor 15. More specifically, and with rererence to FIG. 2, motor 15 drives a turret shaft 16 by means of a chain drive 17, and the fruit orienting device is driven from the opposite end of shaft 16 by a chain 18, a pair of sprockets 19 and 20, and idler pinions 21 and 22. Sprocket 20 is keyed to a shaft 23 for driving a roller conveyor 24, which forms part of the orienting device 10.

The above described apparatus is generally similar to the combination of apparatus and drive means therefor shown and described in applicants' co-pending application Serial No. 271,793. Moreover, both the machine of the earlier filed application and the machine shown in the accompanying drawings operate in a manner to select a single piece of fruit, shape the fruit, and position it for transfer to a rotating pitting turret. In brief, device 10 performs these functions as follows:

Dried, drupaceous fruit are fed into the lower region of fruit orienting device 10 by a standard conveyor C, indicated schematically in FIG. 1. The prunes fall from the conveyor into a hopper H and are then picked up by a roller of roller conveyor 24. Each roller of the roller conveyor is rotated with the advancement of the chain to which it is mounted, and in a rotational direction tending to sweep a supported piece of fruit from the hopper H and along an inclined support ramp R. The ramp extends from hopper H as a narrow strip, capable of supporting only those pieces of fruit in line with the ramp. Furthermore, ramp R is inclined at an angle of approximately 45° (as more particularly described in the co-pending application) so that only one piece of fruit can be advanced by any one roller member and all other pieces of fruit which may have been supported in front of a given roller (and in line with the ramp) are either returned to the hopper H or forced laterally off the narrow supporting surface of the ramp to be received in a lower supporting hopper H'. The single piece of fruit which is advanced by each roller is carried beneath a rotatable roller turret T which presses the fruit against the ramp, shaping it into a substantially cylindrical shape while partially orienting the pit within the prune. Thereafter, the fruit is moved onto and along a pair of spaced rollers which support the fruit and align it until it is picked up by a pair of gripping fingers mounted to the pitting turret head 25 of machine 11. Within approximately 180° rotation of turret head 25, each prune that is picked up from the pair of spaced rollers will have been pitted and deposited into a receptacle 26 disposed beneath the turret head, the pits thereof falling through a vertical chute 27.

Since details of the hoppers H and H', conveyor C, ramp R, and turret T are fully set forth and described in applicants' co-pending application, the specific construction of those parts has not been shown and no greater explanation of their purpose and function (than that given above) is believed necessary to a complete understanding of this invention. However, since there is novel utility in the manner by which applicants' device 10 positions a piece of fruit relative to a pair of pick-up fingers, using spaced support rollers, details of that portion of the fruit orienting apparatus are to be described. In addition, since the pitting turret 24 is entirely different in its construction and manner of operation compared to the aforementioned co-pending application, a full and complete description of its parts will be also given.

Apparatus for aligning drupaceous fruit relative to pitting turret

Referring to FIGS. 3-9 in particular, roller conveyor 24 is driven by a pair of sprockets 30 and 31 secured to shaft 23, said shaft being supported in a pair of bearings 32 and 33 mounted on side plates 34 and 35, respectively. It will be understood that the side plates are secured to and supported from end frames 12 and 13 as by conventional bracing members.

A pair of spaced support rollers are provided at the upper end of ramp R, said rollers being parallel to each other and inclined at an angle of approximately 45°. The rollers are supported from a plate 38 connected between side plates 34 and 35, and are mounted from a roll support bracket 39 having a pair of spaced support rods 40 and 41 anchored to the bracket by set screws 42. With particular reference to FIG. 8, rolls 36 and 37 are made from circular tubing and are rotatably supported upon rods 40 and 41, respectively. Means is provided for rotating the rolls at the same peripheral speed and in a manner tending to move a supported piece of fruit toward the opposite roller. For this purpose, there is provided a gear drive comprising a gear 44 mounted on a shaft 45 supported in a bearing 46, said gear being peripherally engaged with the tooth surface 37a of roller 37. An idler pinion 47, held in mesh with gear 44 and also peripherally engaged with the tooth surface 36a of roller sleeve 36, is rotatably supported upon a fixed shaft 48 mounted to roller support bracket 39 by a set screw 49. A small electric motor 50 is employed for driving shaft 45 and gear 44 through a flexible connection 51.

The primary purpose and function of rollers 36 and 37 is to locate and position each prune deposited thereon with precise alignment relative to a pair of pick-up fingers. Thus, in the event that a piece of fruit is delivered onto the rollers and out-of-center with respect to the spacing between rollers, that roller which supports the greater weight of the prune will possess greater driving force by reason of greater frictional contact. The misaligned piece of fruit will then be moved transversely onto the other roller until the weight of the fruit is balanced between the two rollers. This condition will be maintained until such time that the supported prune is picked up by a pair of fingers of the pitting turret, in a manner to be more particularly described.

Figure 4:
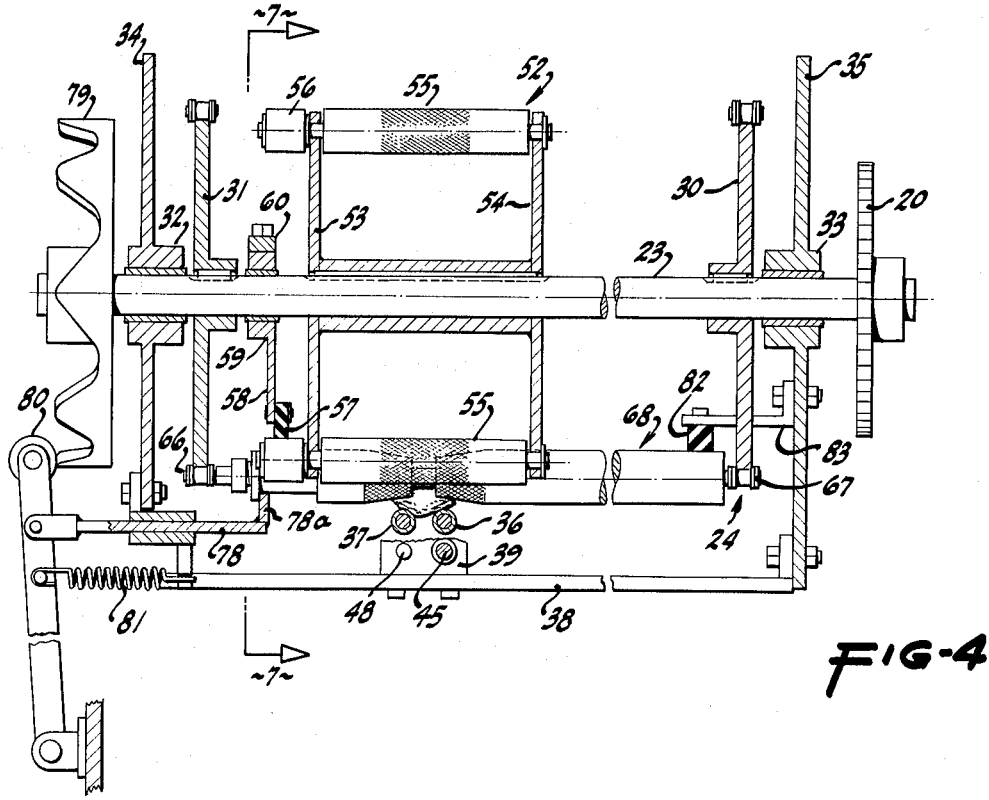
FIG. 4 is a section of the prune conveyor taken on line 4—4 of FIG. 3.

During the period that a fruit is supported and moved along rollers 36 and 37, it is simultaneously held against the rollers by a roller turret 52 mounted to drive shaft 23, as shown in FIG. 4. Roller turret 52 comprises a pair of star end plates 53 and 54 having rollers 55 rotatably mounted between the spaced parallel arms of each plate. A drive roller 56 is provided integrally with each roller 55, and as turret 52 is rotated with shaft 23, rollers 56 come into engagement with an arcuate friction shoe 57 supported from drive shaft 23 by a plate 58 having a bearing collar 59. A torque arm 60 interconnects plate 58 with side plate 34, thereby holding friction shoe 57 fixed although it is supported in part by rotating drive shaft 23.

Figure 3:
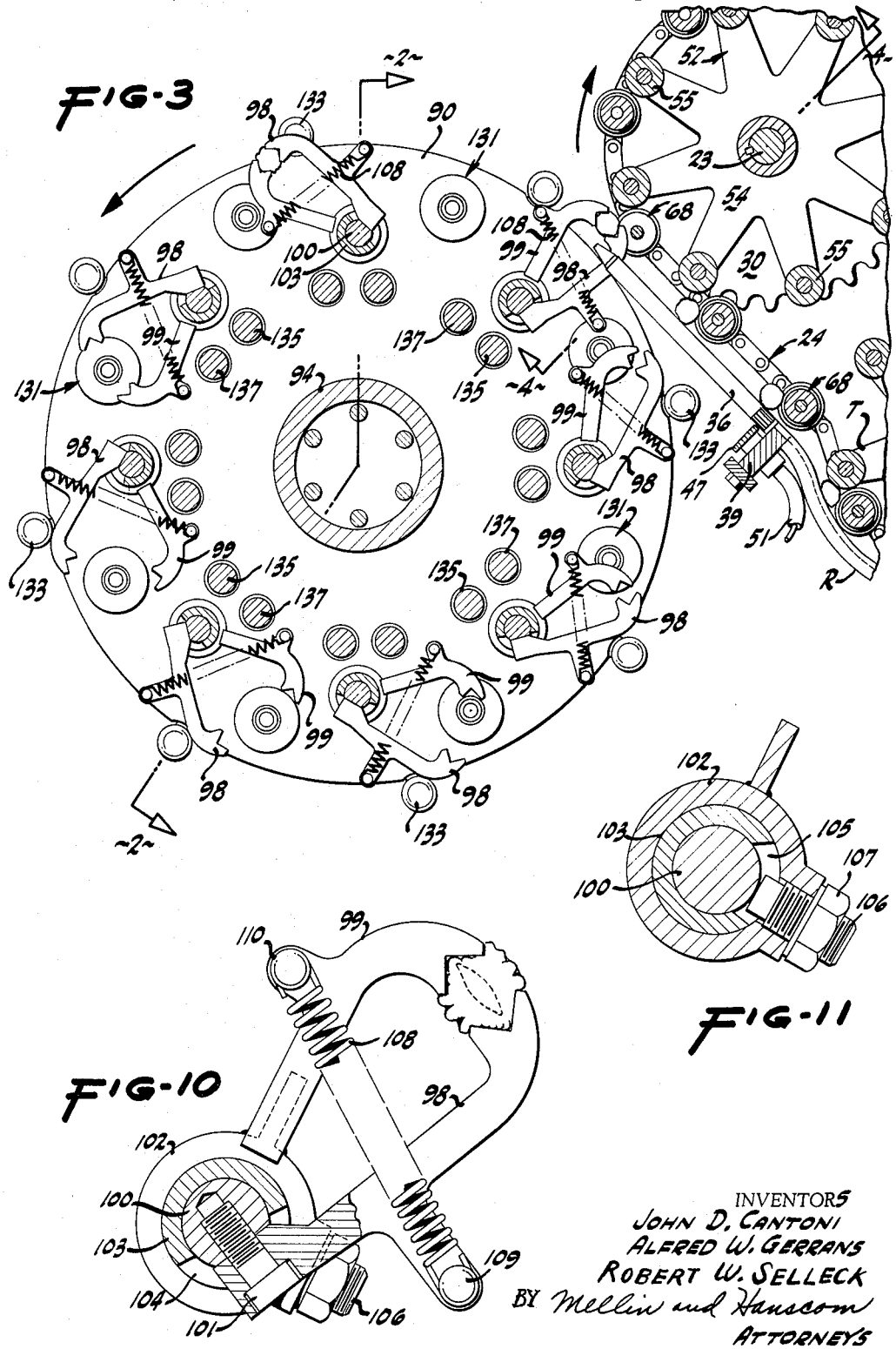
FIG. 3 is a section taken on line 3—3 of FIG. 2, showing the operative relationship between the pitting turret and the prune conveyor.

With reference to FIG. 3, rollers 55 begin to rotate when their associated drive roller 56 comes into engagement with the arcuate shoe 57, and the rollers are rotated from a time shortly before they come into engagement with the upper surface of a prune until a time after the roller is lifted from contact with the prune. Importantly, it is desirable that the peripheral speed of rotation of rollers 55 should be substantially the same as the rotation of prunes moved along support rollers 36 and 37. If there is great disparity between their rotational speeds, it is possible that the frictional contact between rollers 55 and their engaged prune will effect a transverse movement of the prune relative to its support roller, resulting in misalignment.

The angular spacing of rollers 55 is, of course, matched to the spacing between the rollers of conveyor 24, and since both the turret roller 52 and roller conveyor 24 are driven by a common drive shaft 23, each prune advanced by the roller conveyor will be captivated between a roller 55 and a roller of conveyor 24 while the prunes are being moved along support rollers 36 and 37.

Figure 5:
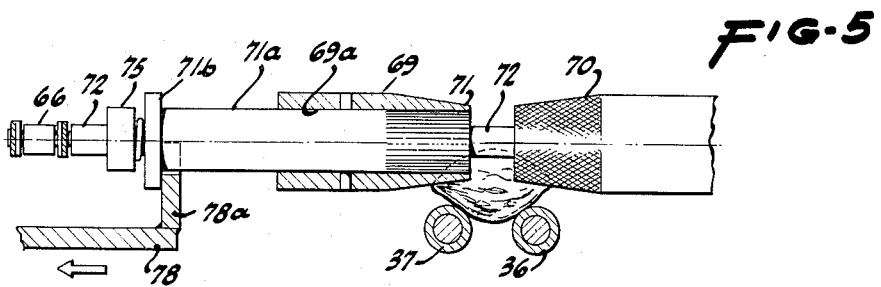
FIG. 5 is an enlarged detail and section of the support rollers and a conveyor roller substantially as illustrated in FIG. 4 but where the intermediate contact member of the conveyor roller is retracted.
Figure 6:
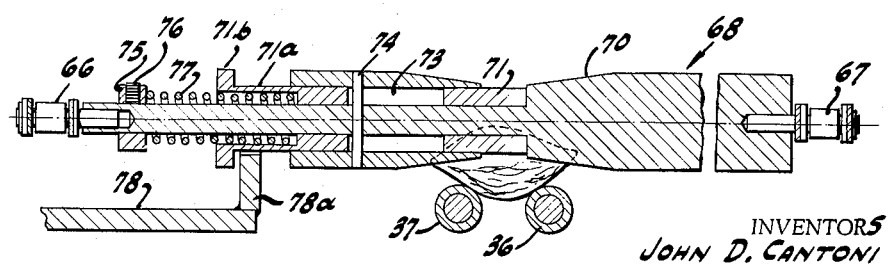
FIG. 6 is a longitudinal center section of one roller of the roller conveyor.

Although roller conveyor 24 operates much the same as the roller conveyor employed in the orienting device of applicants' co-pending application, the construction of the rollers is quite different. Referring to FIGS. 4–6, roller conveyor 24 comprises a pair of continuous chains 66 and 67 having roller members 68 rotatably connected therebetween. Each roller 68 comprises a pair of spaced, fruit engaging contacts 69 and 70, and an intermediate retractible contact member 71. Contact 69 is formed as a sleeve having a core cavity 69a into which contact member 71 may be retracted. Rollers 68 more particularly comprise a rod support 72 formed integrally at the end of contact 70, the retractible intermediate member 71 being tubular and having a stem 71a extending through the core cavity of contact member 69. Stem 71a is slotted along the portion of its length indicated by the reference number 73, and a pin 74 mounted to contact 69 extends through slot 73, pinning contact 69 to rod 72 but allowing limited axial movement of member 71. As a result of this construction, all three contact surfaces 69, 70 and 71 are simultaneously rotated, although the intermediate contact 71 may be axially retracted relative to contacts 69 and 70, in the manner shown in FIG. 5.

A collar 75 is adjustably secured near the end of rod 72 by a set screw 76, and a coil spring 77 is disposed between collar 75 and the end of tubular rod 71a. Spring 77 serves as a resilient means tending to hold the retractible intermediate contact 71 between contacts 69 and 70 and, more especially, against the end surface of contact 70. The end of tubular rod 71 may be counterbored, as shown, to provide a housing for spring 77.

Although spring 77 normally holds contact 71 in the position of FIG. 6, a retracting means comprising a slide rod 78 having a lip 78a is disposed in the vicinity of support rollers 36 and 37; and as each roller 68 comes into a position where a pair of fingers of the pitting turret 25 are to pick up a piece of fruit, rod 78 is retracted, moving its lip 78a against the end collar 71b, compressing spring 77 and retracting intermediate contact 71. The actuating means for rod 78 comprises a control cam 79, mounted to the end of drive shaft 23, and a cam follower 80 that rides on the surface of cam 79. A spring 81 retains the roller follower into engagement with the cam surface, said spring also tending to return rod 78 to the position shown in FIG. 6 where spring 77 is permitted to move contact 71 against the end surface of contact 70. Thus, it will be evident that rollers 68 normally provide a continuous contact surface while moving an engaged piece of fruit toward a pick-up position. But, as the rollers 68 near such a position their intermediate contacts 71 are retracted, thereby permitting a pair of pick-up fingers to be moved between the spaced contacts 69 and 70.

Each roller assembly 68 engages a stationary friction rail 82 mounted from side plate 35 by a number of angle plates 83. Since the friction rail 82 contacts the roller assembly along their top surface and above their pivot axis, each roller is rotated with a movement tending to sweep the fruit along the ramp R as well as rollers 36 and 37. Moreover, the peripheral speed of fruit contacts 69–71 is approximately equal to the rotational speed of the fruit as it is moved along rollers 36 and 37.

A brief description of the fruit orienting and aligning device 10 is as follows:

Fruit is fed into the hopper H by the conveyor C to provide a continuous supply. It is desirable that a surplus of prunes be maintained in the hopper to insure that at least one prune will be picked up by each roller assembly 68 of the conveyor 24 as it passes along the bottom of the hopper. Should more than one prune be picked up by any given roller assembly, all but one of those prunes will be discharged from the roller before it arrives at a position subjacent to turret T. As previously indicated, this is accomplished, in part, by making the vertical incline of the support ramp R approximately 45°, or such that a single prune will fall in front of and against the roller of the conveyor with a nearly equal distribution of the prune's weight against the roller and the ramp. Importantly, also, roller assemblies 68 move with an upward sweeping motion that rolls the fruit (rather than skid) up the inclined surface of ramp R, and the ramp has a limited width approximately equal to one piece of fruit. Thus, all prunes ahead of a roller assembly leaving hopper H, except those remaining in alignment with the concave area of the roller assembly, will drop from the upper edge of the hopper or the lateral edges of ramp R. Usually, only one prune will emerge from the hopper while being supported upon the ramp and contacted by a roller assembly. However, in a case where two prunes remain in a concave area of a roller, both resting against the roller, one of these will be forced laterally off the narrow supporting surface provided by the ramp, since the rotational movement of rollers 68, together with their concave cylindrical configuration, tend to move the heavier of two prunes toward its center. Although the shape of prunes may also be a contributing factor to this selection process, it is the natural physical difference between prunes that causes such a result.

Where two prunes are carried from the hopper H, one in front of the other and in substantial alignment with the concave surface provided by contacts 69, 70 and 71, the additional weight of one prune against another that rests against the roller contacts will cause that prune resting against the roller to be rolled over the top of the roller, leaving the said one prune in front by itself. Of course, the method of selecting a single prune is repeated in the event that more than two prunes are supported by a single roller, each in alignment with ramp R.

Prunes which fall from the upper edge of hopper H or the side edges of ramp R are received in the lower hopper H', and all such prunes may be recirculated back into hopper H by means of additional conveyor structure, not shown.

As each prune is advanced beneath turret roller T, it is massaged and rolled into a substantially cylindrical shape. Moreover, the action of rollers mounted on the turret T tends to centralize the pit of the prune both axially and radially relative to the flesh of the prune. This operation conditions the prune so that it may be properly aligned for pick-up by a pair of fingers of the pitting turret 25 while also preparing the fruit for pitting.

It is to be understood that the foregoing description of operation is essentially the same as that set forth in applicants' co-pending application, Serial No. 271,793. The particular novelty in the orienting and transfer apparatus 10 resides in the use of the counter-rotating rollers 36 and 37, the hold-down roller turret 52, the construction of rollers assembly 68 to permit retraction of an intermediate contact member, and the use of such members in combination with a pair of pick-up fingers of a pitting turret. In this connection, rollers 36 and 37 provide a final longitudinal alignment of the prune so that it will be gripped nearest its center by a pair of pick-up fingers. The spacing of roller contacts 69 and 70 is at least as great as the width of a pick-up finger to permit their passage thesrebetween. Thus, as fruit is rolled from ramp R and moved along rollers 36 and 37, the intermediate contact 71 of the roller assembly 68 that approaches a point of pick-off is retracted, permitting a finger mounted on the pitting turret 25 to be moved in back of the supported fruit. After pick-off, the retracted member 71 is returned to a position intermediate contacts 69 and 70.

It is particularly contemplated that the retractible intermediate contact member 71 might be altogther eliminated from the roller assembly 68. However, its elimination would leave a catch space between the contacts 69 and 70 during the period that a fruit was picked up from the hopper H. Unless the spacing between the contacts is quite small, a prune might become lodged endwise in that space, making proper alignment impossible. The elimination of intermediae contact 71 is largely dependent upon the width of the pick-up fingers employed, and which must be moved between contacts 69 and 70.

*Description of pitting apparatus*

Figure 2:
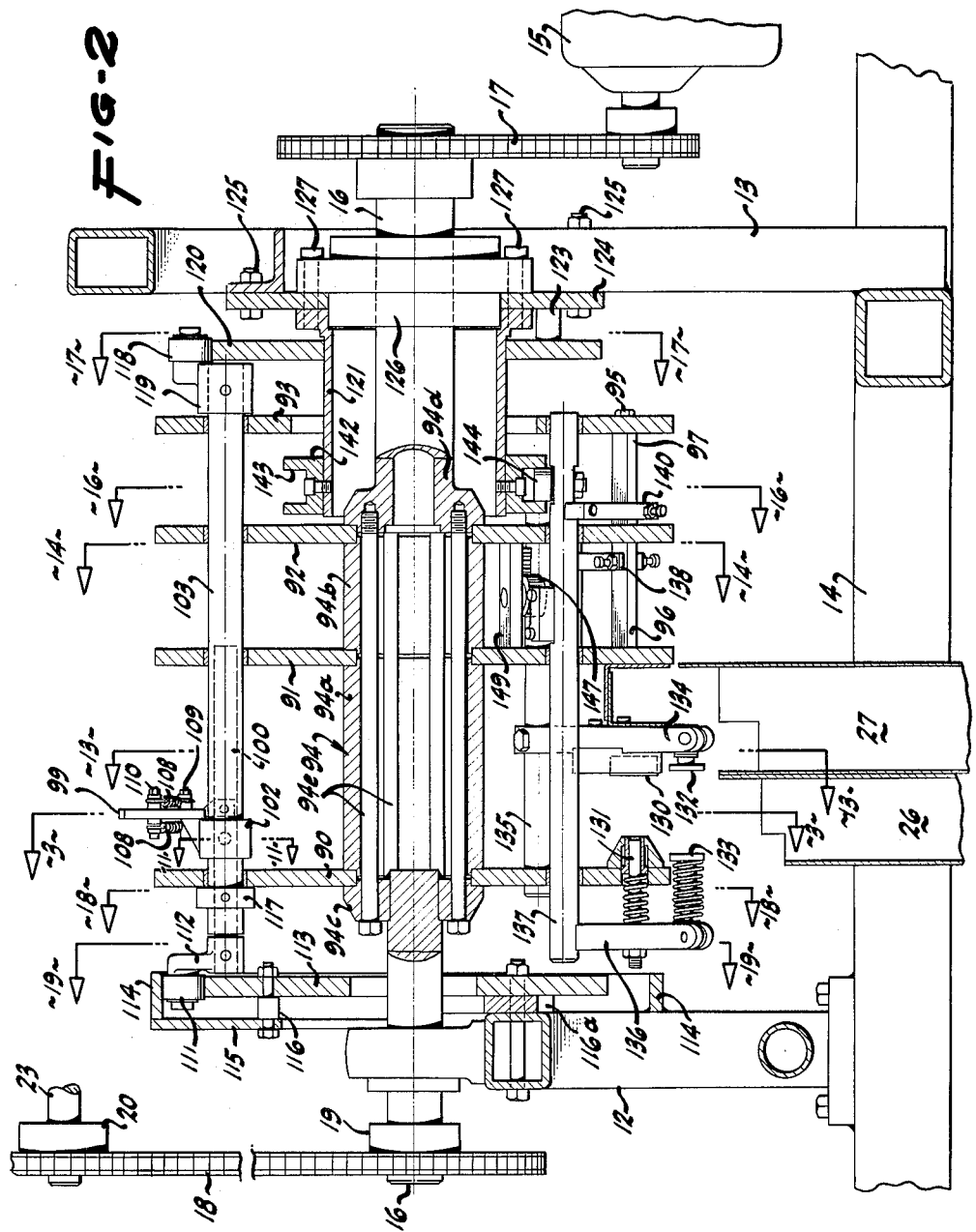
FIG. 2 is a simplified elevation of the pitting turret shown in FIG. 1, as viewed from the right side and showing only those parts of the pitting turret mounted on the broken line 2—2 of FIG. 3.

Referring to FIG. 2 in particular, the rotatable pitting turret 25 comprises four parallel support plates 90, 91, 92 and 93 mounted to an arbor 94 that forms an intermediate portion of drive shaft 16. Plates 90, 91 and 92 are secured between coaxial sleeves 94a, 94b and flange plates 94c, 94d, said sleeves and plates forming the arbor 94 and being held together in a rigid assembly by through bolt connections 94e from arbor 94. Plate 93 is indirectly supported from plates 91 and 92 by through bolts 95 and rectangular spacer sleeves 96 and 97, said sleeves being disposed intermediate plates 91–92 and 92–93, respectively.

Turret 25 supports eight pairs of gripping fingers arranged circumferentially at equal angles apart and equal radial distances from the axis of turret rotation. Each pair of fingers comprises a pick-up finger 98 and a clamping finger 99, both mounted for pivotal movement upon a common axis. More particularly, pick-up fingers 98 are secured to primary control shafts 100 by bolts 101 and fingers 99, mounted to collars 102, are pivotally supported upon tubular secondary control shafts 103. Each shaft 103 extends through coaxially aligned openings in support plates 90, 91, 92 and 93, and support rods 100 are rotatably received within one of the shafts 103, respectively. A transverse slot 104, provided in tubular shafts 103, allows one end of each finger 98 to be secured to its support rod 100, best shown in FIG. 10. Moreover, the angular sector defined by slots 104 is larger than that necessary to mount the finger 98 to rod 100, thereby providing additional clearance between fingers 98 and the limiting surfaces of slots 104, and permitting independent rotation of primary control shaft 100 and secondary control shaft 103.

Referring to FIG. 11, a transverse slot 105 is formed in each shaft 103 for receiving the end of a stop pin 106 threaded through a nut 107 mounted to a collar 102. The clearance between the ends of slot 105 and pin 106 allows finger 99 (and its support collar 102) to pivot through a small angle relative to its support shaft 103. Thus, prunes of various size and shapes may be gripped independently of the actuating movement of control shaft 103.

Fingers 98 and 99 are urged together by a pair of helical springs 108 stretched between anchor pins 109 and 110 that extend through and are mounted to fingers 98 and 99, respectively. The tension of springs 108 is sufficient to pivot secondary control shaft 103 within its supports relative to a positive operation of inner shaft 100 as will become more apparent in view of the following description of operation hereinafter set forth.

Referring to FIG. 2, one end of primary control shaft 100 carries a cam follower 111 rotatably mounted on an offset torque arm 112 pinned to the shaft. Follower 111 moves in a cam track defined by the peripheral edge of an inner cam plate 113 and an outer cam ring 114 that is partly supported from plate 113 by means of arms 115 and bolt connections including spacer sleeves 116. The lower end of ring 114 is welded to support frame 12, and cam plate 113 is supported from the frame by bolt connections including spacer sleeves 116a. A stop collar 117, mounted to shaft 103 near support plate 90, restricts axial movement of shafts 100 and 103 in a direction toward the right, as viewed in FIG. 2.

A cam follower 118 is rotatably mounted from the end of sleeve 103 upon an arm 119. The mounting collar of said arm makes contact with the surface of support plate 93, preventing axial movement of sleeve 103 to the left. Cam follower 118 moves around the peripheral surface of a secondary control cam 120 to operate gripping fingers 99 against the resilient bias of springs 108, and the cam 120 is supported by a cylindrical housing 121, mounted coaxially of drive shaft 16 from end frame 13. Cam plate 120 is stabilized by bolt connections 122 including spacer sleeves 123 disposed between the cam plate and a bearing support plate 124, said plate being mounted to end frame 13 by means of bolt connections 125. Both housing 121 and a drive shaft bearing assembly 126 are mounted to plate 124 by bolt connections 127, all as shown in FIG. 2.

FIG. 12 of the drawings best illustrates the manner in which a pair of gripping fingers 98 and 99 is operated to pick up a piece of fruit from the spaced rollers 36 and 37. For this purpose, two pairs of gripping fingers, indicated generally by reference letters A and B, occupy identical positions to the two pairs of gripping fingers nearest the prune conveyors, as shown in FIG. 3. Three intermediate positions of the pick-up fingers are indicated in phantom by the broken lines referenced C, D and E. The position of gripping fingers A and B, as well as the intermediate positions of finger movement C, D and E are, of course, determined by the profile of cams 113 and 120. A portion of each cam's profile is also shown in FIG. 12, together with cam followers for each pair of fingers (and the three intermediate positions).

As cam followers 111 travel the profile of cam 113 through the angle D, shaft 100 is pivoted in a counterclockwise direction to place finger 98 more directly beneath the piece of fruit which it is to pick up from spaced rollers 36 and 37. Control shaft 103 is held in a fixed position during the initial movement of control shaft 100 and, therefore, finger 98 moves away from finger 99 to receive the fruit. However, as cam follower 118 moves along the cam surface 120 through an angle B, fingers 98 and 99 move relatively toward each other, gripping the piece of fruit supported on spaced rollers 36 and 37. Roller assembly 68 which is advancing the piece of fruit has its intermediate contact member 71 retracted at this time.

As cam followers 111 and 118 follow identical cam profiles through the angle $\theta$, fingers 98 and 99 are pivoted together with the fruit they support into a position opposite a pair of convergent compression heads or clamps, which are hereinafter more particularly described. Then, during an angle of movement $\phi$ (a dwell period), the fingers are held opposite the compression heads while they are quickly brought together, striking opposite ends of the fruit. After the short dwell period, and while following symmerical cam profiles through an angle $\pi$, fingers 98 and 99 are rocked into a position, placing the gripped piece of fruit in alignment with a pitting die and its associated pitting plunger, the construction and operation of which is now to be described.

Referring again to FIG. 2, each pair of fingers 98 and 99 is respectively associated with a pitting die 130, a pitting plunger assembly 131 and a pair of compression heads 132 and 133. Each pitting die 130 and a compression head 132 are supported from an arm 134 secured to a shaft 135 that is reciprocally mounted in parallel support plates 90–93. In similar fashion, each plunger assembly 131 and a compression head 133 is mounted to an arm 136 and a supporting shaft 137.

Referring to FIGS. 14 and 16, shafts 135 are reciprocally guided by a bifurcated torque arm 138 having a pair of adjustable stops 139 engaged with opposite sides of the rectangular spacer sleeve 96. Shafts 137 are similarly guided by bifurcated torque arms 140 having a pair of stops 141 adjusted into surface engagement with opposite sides of rectangular spacer sleeve 97.

Complementary pairs of shafts 135 and 137 are moved together but in opposite directions by a cylindrical cam 142 having a continuous cam recess 143, best shown in FIGS. 2 and 20. A roller follower 144 mounted to shaft 137 is disposed within recess 143. Cam housing 142 is rigidly supported from cam support housing 121 and is secured thereto as by a number of radial bolts, shown in FIGS. 2 and 16.

Referring to FIG. 20 in particular, a pair of racks 145 and 146 are mounted to an associated pair of shafts 135 and 137, respectively. A pinion 147, rotatably mounted on a pin 148, is supported in mesh with each pair of racks 145 and 146, said pinions being disposed between parallel support plates 91 and 92 and having their support pins 148 mounted between a pair of support bars 149 and 150 bolted to said plates.

It will be apparent that rotation of turret 25 will cause roller follower 144 to be moved within the recess 143 of cylindrical cam housing 142. As a consequence, shaft 137 will be reciprocally moved in the openings of support plate 90–93. The movement of rack 146 will rotate the pinion 147 that is meshed therewith, thereby producing equal but opposite movement of the associated rack 145 and the shaft 135 to which it is mounted.

FIG. 22 illustrates the preferred manner of construction for compression heads 132 and 133. More particularly, compression head 132 is formed with a conical recess 155 and the head is adjustably mounted to support arm 134 by a threaded stem 156 and secured by a clamping screw 156a. Accordingly, minor adjustments may be made in the degree to which head 132 strikes a piece of fruit held by a pair of gripping fingers, other than by changing the shape of control cam recess 143.

Compression head 133 has an axial recess and is mounted to support arm 136 by a bolt 157 having a threaded end 158 and secured thereto by a clamping screw 158a. The extended end of support pin 157 is formed with an enlarged collar 159 that limits movement of head 133 by making contact with a shoulder 160 within the recess of the compression head. A helical compression spring 161, disposed between support arm 136 and a collar of compression head 133, resiliently urges shoulder 160 against collar 159. The fruit engaging surface of compression head 133 is formed with a conical recess identical to that formed on compression head 132.

Referring to FIGS. 20 and 21, each pair of clamping heads 132 and 133 are moved toward each other as to clamp upon the ends of a piece of fruit as the cam follower 144 moves along that portion of the cam recess identified by the reference number 143a. At this time, it will be observed, the associated pair of gripping fingers are maintained in a dwell position since both roller followers 111 and 118 are at that time moving through the angle φ. The movement of compression heads 132 and 133 is extremely rapid, thereby striking the ends of the fruit and placing the ends of its pit near to its surface. Moreover, the retraction of the compression heads is begun immediately after the heads are brought together, said retraction being effected as cam follower 144 travels along that part of the recess 143 indicated by the reference number 143b.

Immediately after the compression heads are retracted, fingers 98 and 99 are pivoted to position its fruit coaxially relative to the pitting die 130 and the pitting plunger assembly 131, this angle of movement being indicated by the angle π in FIG. 21. During this movement of the fingers, roller follower 144 moves along that portion of the cam recess, indicated by the reference 143c, a period of dwell for support shafts 135 and 137. (A more complete description of the pitting operation will be given with relationship to FIGS. 20 and 21 immediately following a description of the pitting dies and pitting plungers.)

Referring to FIGS. 23–27, each pitting die 130 is made of resilient material and formed with concave surfaces on both sides thereof. A very small center opening 170 is formed through the die centrally of its concave surfaces. Four additional small openings 171, shown in FIG. 23, are formed in the die at equal radial distances relative to the small opening 170 and each opening 171 is connected to the opening 170 by a radial cut 172. Thus, the pitting die comprises a number of convergent wedge-shaped sections 173, each of which may be flexed inwardly independently of the others. This die construction has several advantages, one being that it insures a peripheral squeezing action upon the surfaces of the pit as the pit is moved through the die. In addition, the small openings 171 add considerable life to the pitting die, since they provide room for material expansion and increase the surface area of flexure as a pit is pushed through the die; and the concave surfaces of die 130 serve as a guide for the prune while tapering each wedge-shaped section 173 toward the opening 171, thereby localizing and directing the resilient force of each wedge toward a small area of contact with the pits as they move through the die. This is best illustrated by FIG. 26 where the force of the sections 173 are applied only along the trailing edge of the pit, thereby squeezing the pit to force it onward through the die while pulling the pit away from the fruit's flesh.

Figure 23A:
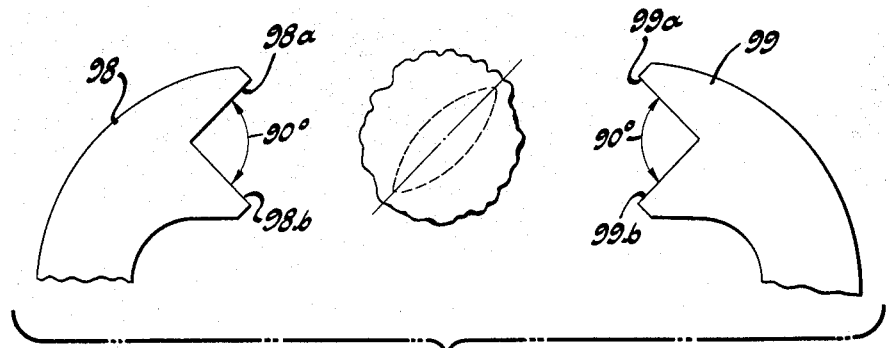
FIG. 23A is an elevation of a pair of gripping fingers shown relative to a prune and its pit immediately prior to pick-up.
Figure 23B:
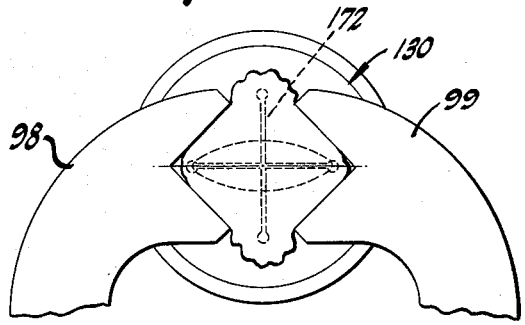
FIG. 23B illustrates one possible orientation of a gripped prune relative to a pair of gripping fingers and an associated pitting die.
Figure 23C:
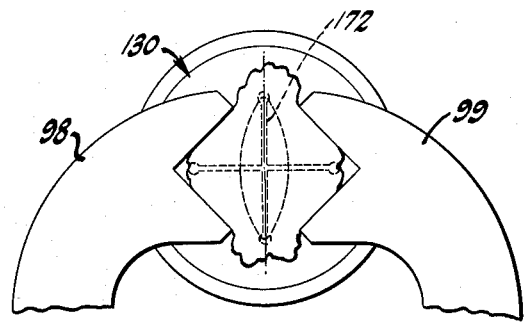
FIG. 23C illustrates a second possible orientation of a gripped prune to a pair of gripping fingers and an associated pitting die.

The effectiveness of pitting prunes with minimum rupturing of the prune flesh is greatly enhanced by orientating the pitting die 130 so that at least one pair of diametrically opposed radial cuts 172 are aligned relative to the major transverse diameter of the pit being pushed through the die. This is accomplished in part by providing gripping fingers 98 and 99 that, when brought into engagement with the prune, move and locate the prune pit into a position where its major transverse diameter is in one of two positions, each normal to the other. Referring to FIG. 23A, fingers 98 and 99 are each formed with intersecting surfaces that meet at substantially right angles, i.e., surfaces 98a and 99a are approximately perpendicular to surfaces 98b and 99b, respectively. It has been found that with such an arrangement of surfaces, and by applying sufficient gripping force, the pit of the prune will become oriented with its major transverse axis either aligned between lines of surface intersection, as shown in FIG. 23B, or disposed normal thereto, as illustrated by FIG. 23C. Then, by properly orienting a pitting die, such as that shown, which has two pairs of diametrically opposed radial cuts 172, one pair perpendicular to the other, the major transverse diameter of any prune pit will necessarily become aligned with one or the other of said two pairs of diametrically opposed cuts. These two possible relationships are shown by FIGS. 23B and 23C, respectively.

Each pitting die 130 is mounted in a collar 174 having a backing ring 175. When the dies 130 become worn they may be easily removed from the forward side of the cup 174 and replaced by a new die member.

Pitting plunger assembly 131 comprises a plunger guide and stripping die 180, an outer holding sleeve 181 and an inner pitting rod 181a axially movable relative to sleeve 181. Holding sleeve 181 is also mounted for limited axial movement within guide 180, said sleeve having a bevelled surface 182 that is brought into surface engagement with a gripped piece of fruit before it is pitted by rod 181a. The fruit engaging end of pitting rod 181a is formed with a peripheral edge having an inclined surface 182a that is a continuation of the bevelled surface 182 when parts of plunger assembly 131 assume positions as shown in FIG. 24. At such times the peripheral end of rod 181a is located axially in back of the inner lip edge of bevelled plunger surface 182. The effect produced by this structural relationship is that the ends of the prune pits will be guided into engagement with the end of rod 181a, surface 182a retaining contact during the actual pitting operation.

Surface contact between a shoulder 183 of guide 180 and a collar 184 of the plunger sleeve serve to limit the movement of the sleeve, in the manner shown in FIG. 25. A helical compression spring 185, mounted coaxially of pitting rod 181a and disposed intermediate collar 184 and an adjustable stop 186 threaded to the end of rod 181a, urges sleeve 181 against a pin stop 187 mounted transversely to the pitting rod. A slot 188 formed through sleeve 181 allows rod 181a to be moved after collar 184 engages shoulder 183, as shown in FIG. 26.

It is to be noted that the movement of pitting rod 181a is restricted, compressing the fruit and forcing the greater portion of the fruit's pit, but less than the whole pit thereof, through die 130. While the end of rod 181a approaches the front surface of the pitting die, there is sufficient clearance provided so that the contacted surface of the fruit is neither pierced nor ruptured, and as the pitting rod is retracted by positive movement of support arm 136, spring 185 holds sleeve 181 against the flesh of the fruit until pin stop 187 engages the end of slot 188. At this time, both pitting rod 181a and the outer holding sleeve 181 are retracted together.

In most instances, the pitted piece of fruit will cling to the end of sleeve 181 and rod 181a, being carried back against stripping die 180. It is preferred to employ a stripping die having a limited surface of contact 189 since a large surface engagement with a piece of fruit, such as a prune, may result in adherence.

The resulting depitted prune product that is produced by the method and apparatus shown and described has a generally circular and dished shape with a pocket formed in one end of its pit axis. The concave surface of the prune pocket is unbroken, although the outer surface on the opposite side of the pocket has a small pit removal opening. Such an article has great advantage in the preparation of an hors d'oeuvre, fruit salads and the like. Since the flesh of the fruit is relatively unbroken, it is not sticky to the touch, and the compressed fruit will tend to retain its shape by reason that pit-connecting fibers are drawn through the pit removal opening on the opposite side of the pocket. The pocket of the prune may, of course, be filled with either a cheese, olives, maraschino cherries, or other delicacies commonly used in the preparation of hors d'oeuvres.

Referring again to FIGS. 20 and 21, the movements of fingers 98 and 99 may be further compared with the actuating movement of their associated pitting plunger assembly and die; and the positional relationship of the plunger assembly and die, shown in FIGS. 24, 25 and 26 may be directly related and identified with roller followers indicated by reference letters F, G and H, respectively, of FIG. 21. The fingers controlled by cam followers F are in a dwell cycle during which the pitting plunger and die are moved into engagement with a gripped piece of fruit; cam followers indicated by reference letter G (and their associated fingers) correspond to the position of the pitting plunger and die, as shown in FIG. 25, the fingers being partly opened.

Referring to FIG. 21, it will be noted that the fingers open slowly at first as the pitting die 130 and holding sleeve 181 are brought into contact with the fruit. Then the fingers are suddenly opened to provide ample clearance as the pitting stroke is completed, such a position being indicated in FIG. 26, which may be related to the position of cam followers H of FIG. 21. Each pair of fingers is retained in an open position until the pitting die, sleeve 181 and rod 181a are fully retracted into the positional relationship shown in FIG. 27.

For purposes of further comparison, and with reference to FIG. 20, the pitting die and plunger are moved into engagement with the fruit as cam follower 144 travels along the portion 143d of cam recess 143; the pitting plunger and die are held for a short period while the gripping fingers are spread apart, cam follower 144 being moved along the section 143e; and the follower then passes along the portion of recess 143 designated as 143f, during which time the pitting operation is completed. The pitting die and plunger are then immediately retracted as cam follower 144 travels along the recess portion indicated by 143g.

Referring to FIGS. 2, 29 and 30, means is provided for channeling the pits of the prunes as they leave the pitting dies 130 to direct them into chute 27. This means comprises a collar 190 formed integrally with a mounting ring 191 attached to the face of support plate 91. In addition, divider plates 192, each having an arcuate wall 193 slidable relative to collar 190 and an upstanding wall 194 mounted to the back side of pitting die holder 174, prevent the movement of any pits in a radial direction toward the turret axis. A barrier wall 195, also forming a part of plates 192, cooperates with the upper edge of the adjacent wall 194 to seal the area on the discharge side of the pitting die from exposure to the interior of the turret no matter what position the turret may occupy. This cooperation is important in the event that a pit should adhere to the back side of the pitting die and be released after three-quarters of its rotation. If the barrier wall 195 was not provided, the pits could fall between divider plates 91 and become lodged in the center of the turret. Although the inadvertent discharge of a pit toward the center of the turret would not be likely to impair its operation, it is desirable, for purposes of cleanliness (and to obtain localized discharge), that the protective barriers be used.

A brief summary of the pitting turret's operation is as follows:

Pitting turret 25 rotates synchronously with the advancement of roller conveyor 24, and the spacing of each pair of fingers 98 and 99 complements the spacing between roller assembly 68 of the roller conveyor, as well as the spacing between rollers 55 of roller turret 52. Thus, it will be seen that each pair of pick-up fingers are spread apart and moved under a piece of fruit as it is advanced along spaced rollers 36 and 37 by a roller assembly 68. The pick-up of each piece of fruit occurs while the fingers are moved between the spaced support rollers 36 and 37, and while fingers 98 and 99 move between contacts 69 and 70 of that roller assembly which is advancing the piece of fruit. At the moment of pick-up, contact member 71 has been retracted by movement of slidable retracting arm 78 through operation of its control cam 79. Hold down roller 55 of turret 52 is held into engagement with the piece of fruit being moved along roller assembly 98 until after a pair of gripping fingers 98 and 99 clamp upon the fruit. The pair of gripping fingers then pivot the fruit to a position opposite an associated pair of compression heads 132 and 133. The piece of fruit is briefly held at this position while the compression cups are brought together, striking the ends of the fruit and placing the ends of the pit near the surface of the fruit's flesh. The gripping fingers are then rocked upon their common support axis to place the fruit opposite an associated pitting plunger assembly 131 and pitting die 130 with the pit ends of the fruit coaxially aligned between the plunger and die opening. After initial contact has been made by outer holding sleeve 181 and the surface of die 130, gripping fingers 98 and 99 are slightly separated until the fruit is firmly gripped between the die and pitting sleeve. The fingers are then spread wide apart to provide ample clearance for the final pitting operation, where pitting rod 181a forces the greater part of the pit through the opening of the pitting die without rupturing the contacted surface of the fruit. The resilient force of the pitting die segments 173, directed transversely of the pit axis and along the trailing side thereof, pushes the pit through the die while pulling the pit away from the flesh. The pitting rod 181a and sleeve 181 are then retracted and pulled within plunger guide and stripping die 180. Contact between the fruit and a relatively small surface area 188 of the stripping die causes the fruit to fall into chute 26. Simultaneously, the pit of the fruit is discharged between the confining surfaces of collar 190, ring 191, plates 193 and 194, and the barrier wall 195 of an adjacent divider 192. An inclined surface portion of plate 194 directs the pits into chute 27. The above cycle of operation is continuous and repeated for each pair of fingers each time turret 25 completes a revolution.

FIGS. 31–35 illustrate two modifications for a pitting turret 25. In particular, it is contemplated that a pair of compression heads 132a and 133a mounted in fixed relation to the pitting turret may be used as an alternative to providing separate compression heads for each pair of gripping fingers. Compression heads 132a and 133a may be supported on a pair of arms 201 and 202 pivotally hinged by a pin 203 and supported from the framework of the machine. A pair of solenoids 204 and 205 pivotally connected to the arms 201 and 202, respectively, and also mounted relative to the framework of the machine may be used to bring the compression heads together and strike the opposite ends of a gripped piece of fruit, as shown in FIG. 32. The operation of the compression heads would, of course, be timed by the rotation of the turret as by means of a timing cam 206 that operates a switch 207 for energizing both solenoids. Timing cam 206 may be mounted upon a support shaft 208 that is gear driven by shaft 16, insuring synchronism with the rotation of turret 25.

A second modification which is contemplated involves the use of tapered aligning pins 210, each mounted on a support rod 211 secured to an arm 136a that is operated by either the plunger or die actuating shafts 137 or 135. Tapered pin 210 is resiliently pressed outward of shaft 211 by a spring 212; and a pin 213, extending transversely through 211, rides in a groove 214 of aligning pin 210, thereby restricting outward axial movement of pin 210.

Support plate 90a, which corresponds to support plate 90 of the previously described turret, is provided with a special opening 215 for receiving the aligning pin and its supporting rod 211 therethrough. The location of opening 215 and, of course, aligning pin 210 is such that the pin may be placed into contact and between complementary surfaces of finger appendages 198a and 199a while fingers 198 and 199 support a piece of fruit in general alignment between a pitting die and its related plunger. Opposing surfaces of appendages 198a and 199a are located equidistant from a line that bisects the angle between contact surfaces of the gripping fingers and their common support axis, indicated by the reference number 100a.

Inasmuch as no two pieces of fruit will have the identical size and shape, certain small variations in aligning a piece of fruit relative to a pitting die and plunger will occur when using the gripping fingers 98 and 99 of pitting turret 25. The construction of the pitting plunger assembly 131, especially the use of an outer holding sleeve 181 and pitting dies having conical surfaces, minimizes the importance of variations in fruit sizes. Moreover, since the pieces of fruit processed by the pitting machine are preferably graded for uniformity, no serious difficulty will be encountered with the machine constructed as previously described. On the other hand, precise orientation can be obtained by using the alignment pin 210, since the opposing surfaces of appendages 198a and 199a are located equidistant from the line which bisects any gripping angle relationship between a pair of fingers 198 and 199. Furthermore, although fingers 198 and 199 are intended to be controlled and positioned in positive fashion with control cams, such as 113 and 120, the clearance between each roller follower 111 and the confining surfaces of cam plate 113 and cam ring 114 allows each pair of fingers to be pivotally moved with minor adjustments. Thus, as pin 210 is brought into engagement with appendages 198a and 199a, its tapered surface will tend to pivot the fingers 198 and 199 any small amount necessary to place the gripped piece of fruit in precise axial alignment with the associated pitting die and plunger.

Although a preferred embodiment of this invention has been illustrated and described, together with several possible modifications in structure, it is to be understood that various changes and modifications may be made without departing from the spirit of the invention or the scope of the attached claims. For example, each of the control shafts 100, 103, 135 and 137 may be used for supporting a plurality of devices so that several pieces of fruit will be pitted with each complete cycle of operation. Such an arrangement would merely involve a duplication of parts, which is fully contemplated.

What we claim and desire to secure by Letters Patent is:

1. Apparatus for pitting drupaceous fruit comprising: a pitting plunger; mounting means therefor including a plunger guide and stripping die, a plunger sleeve reciprocally mounted in said guide for limited travel, a plunger rod coaxially mounted within said sleeve and having a spring abutment and a sleeve contact, a coiled spring disposed coaxially relative to said rod and seated against said abutment and one end of said sleeve, said spring urging said sleeve toward said sleeve contact; a complementary resilient pitting die having its center disposed coaxially with the axis of said plunger; means for supporting a piece of fruit with pit between said die and plunger and with the pit axis substantially aligned with the center of said die; and means for imparting limited relative movement of said die and plunger to compress a supported piece of fruit therebetween and force the greater portion but less than the whole pit through the die.

2. The pitting apparatus and plunger of claim 1 wherein said abutment is adjustably movable along said rod for controlling the bias imposed by said spring.

3. The pitting apparatus and plunger of claim 1 wherein said plunger sleeve is formed with a bevelled fruit contact surface having its outer lip edge extending beyond its inner lip edge, and wherein the fruit engaging end of said rod is located within said sleeve and transversely adjacent said inner lip edge when said sleeve is held against said sleeve contact by said spring.

4. The pitting apparatus of claim 3 wherein the fruit engaging end of said rod is formed with a peripheral edge having an inclined surface complementary to the bevelled fruit contact surface of said plunger sleeve, the peripheral end of said rod being located axially in back of the inner lip edge of said plunger sleeve when said sleeve is held against said sleeve contact.

5. Apparatus for pitting drupaceous fruit comprising: a pitting plunger and a complementary resilient pitting die having its center disposed coaxially with the axis of said plunger; means for supporting a piece of fruit with the pit between said die and plunger and with the pit axis substantially aligned with the center of said die; and means for imparting limited relative movement of said die and plunger to compress a supported piece of fruit therebetween and force the greater portion but less than the whole pit through the die, said last mentioned means comprising a pair of parallel support rods, a pair of racks mounted to said support rods respectively, a pinion mounted between said racks and in mesh with each, a control cam, and a cam follower mounted to one of said support rods and engaged with said control cam.

6. Apparatus for pitting drupaceous fruit comprising: a pair of fruit engaging fingers, a support shaft, one of said fingers being mounted to said shaft, a tubular sleeve mounted coaxially on said shaft, the other of said fingers being mounted to said sleeve, a spring connected between said pair of fingers resiliently urging them together, a first cam control for pivoting said sleeve against the bias of said spring, a second cam control for pivoting said support shaft, a pitting plunger and a complementary resilient pitting die having an opening, means for mounting said plunger and die on opposite sides of said fingers for simultaneous reciprocal movement to converge upon the ends of a piece of fruit held by said fingers, and actuating means for imparting limited movement of said plunger and die to compress the fruit and force the greater portion but less than the whole pit thereof through said die.

7. Apparatus for pitting drupaceous fruit comprising: a pair of fruit engaging fingers; a pitting plunger and a complementary resilient pitting die having an opening; means for pivoting said fingers together on a common pivot axis and for pivoting one finger on said axis relative to the other, said means including a pair of cam surfaces for producing cyclical movement from a starting position, pivoting said fingers apart and then together to pick up a piece of fruit, pivoting said fingers with their supported fruit to align the fruit relative to said plunger and die, pivoting said fingers apart to release the fruit after it is gripped between said plunger and die, and then returning said fingers to their starting position; means for mounting said plunger and die on opposite sides of said fingers for simultaneous reciprocal movement to converge upon the ends of a piece of fruit held by said fingers; and actuating means for imparting limited movement of said plunger and die to compress the fruit and force the greater portion but less than the whole pit thereof through said die.

8. The apparatus of claim 7 and further wherein said actuating means for imparting limited movement of said plunger and die include a cam surface for producing cyclical movement in timed relation to movements of said fingers, axially moving said plunger and die to grip the pit ends of a piece of fruit held by said fingers, maintaining said plunger and die in spaced gripping relation until said fingers are moved apart, further moving said plunger and die to pit the fruit, and then retracting said plunger and die to a starting position.

9. Apparatus for pitting drupaceous fruit comprising: a pair of fruit engaging fingers, means for pivoting said fingers together on a common pivot axis, means for pivoting one finger on said axis relative to the other, a pitting plunger and a complementary resilient pitting die having an opening, means for mounting said plunger and die on opposite sides of said fingers for simultaneous reciprocal movement to converge upon the ends of a piece of fruit held by said fingers, actuating means for imparting limited movement of said plunger and die to compress the fruit and force the greater portion but less than the whole pit thereof through said die, and means for striking the ends of the fruit while it is being held by said pair of fingers to place the ends of its pit near the surface of its flesh.

10. Apparatus for pitting drupaceous fruit comprising: a pair of fruit engaging fingers, means for pivoting said fingers together on a common pivot axis, means for pivoting one finger on said axis relative to the other, a pitting plunger and a complementary resilient pitting die having an opening, means for mounting said plunger and die on opposite sides of said fingers for simultaneous reciprocal movement to converge upon the ends of a piece of fruit held by said fingers, actuating means for imparting limited movement of said plunger and die to compress the fruit and force the greater portion but less than the whole pit thereof through said die, and an alignment pin mounted for engaging said fingers and centering the piece of fruit relative to the axis of the die opening, said pair of fingers having complementary surfaces for receiving the end of said alignment pin therebetween.

11. Apparatus for pitting drupaceous fruit comprising: a support turret mounted upon a horizontal axis of rotation from a support frame; a plurality of pairs of fruit engaging fingers, each pair being pivotally supported upon a horizontal pivot axis arranged equal angular distances about said turret axis of rotation; means for cyclically pivoting each pair of fingers together on their respective pivot axis and pivoting one finger of each pair relative to the other; a plurality of pitting plungers mounted upon said turret, each pitting plunger being reciprocally supported upon a horizontal axis of reciprocation, associated with one pair of fingers and arranged equal angular distances about said turret axis of rotation; a plurality of pitting dies mounted upon said turret, each pitting die being reciprocally supported upon a horizontal axis of reciprocation, associated with one pair of fingers and having a die opening positioned coaxial with a pitting plunger; and means for cyclically reciprocating said pitting plungers and pitting dies and imparting limited relative movement to compress a piece of fruit supported between each plunger and die and force the greater portion but less than the whole pit thereof through the die opening.

12. The pitting apparatus of claim 11 and further including a pair of clamping heads for each pair of fruit engaging fingers, one clamping head of each pair being mounted on one side of its associated pair of fingers and the other clamping head being mounted on the opposite side of said fingers; and means for bringing said clamping heads toward each other and striking opposite ends of a prune held by their associated pair of fingers prior to pitting.

13. The pitting apparatus of claim 12 wherein each pair of clamping heads is formed with a recess for receiving the pit ends of a finger engaged prune.

14. The pitting apparatus of claim 12 wherein each pair of clamping heads is reciprocally supported with a pitting plunger and a pitting die, respectively, said clamping heads being operated by the means for cyclically reciprocating said pitting plungers and pitting dies.

15. The pitting apparatus of claim 11 and further including a plurality of alignment pins mounted to said turret and respectively associated with a pair of fingers and a pitting plunger, each pin being actuated by the initial movement of its plunger toward its related die for engaging its associated fingers and centering the piece of fruit relative to the axis of the die opening.

16. The pitting apparatus of claim 15 and further wherein the fingers of each pair have complementary surfaces for receiving the end of an alignment pin therebetween.

17. Apparatus for pitting drupaceous fruit, comprising: a pair of fruit engaging fingers, means for pivoting said fingers together on a common pivot axis, means for pivoting one finger on said axis relative to the other; a pitting plunger and a complementary resilient pitting die having an opening; means for mounting said plunger and die on opposite sides of said fingers for simultaneous reciprocal movement to converge upon the ends of a piece of fruit held by said fingers; means for reciprocally moving said plunger and die to grip a piece of fruit and remove its pit; and an alignment pin mounted for engaging said fingers and centering the piece of fruit relative to the axis of the die opening, said pair of fingers having complementary surfaces for receiving the end of said alignment pin therebetween.

18. An apparatus for pitting drupaceous fruit, a pitting plunger assembly comprising a plunger guide, a plunger sleeve reciprocally mounted in said guide for limited travel, a plunger rod coaxially mounted within said sleeve and having a spring abutment and a sleeve contact, and a coiled spring disposed coaxially relative to said rod and seated against said abutment and one end of said sleeve, said spring urging said sleeve toward said sleeve contact; a pitting die having an opening disposed coaxially relative to said plunger rod; means for supporting a piece of fruit with pit between said die and plunger assembly with the longitudinal pit axis substantially aligned with the center of said die opening; and means for moving said pitting plunger assembly relative to said pitting die to grip the piece of fruit between said die and said plunger sleeve and then depit the fruit by further movement of said plunger rod.

19. The pitting plunger assembly of claim 18 wherein said plunger sleeve is formed with a bevelled fruit contact surface having its outer lip edge extending beyond its inner lip edge, and wherein the fruit engaging end of said rod is located within said sleeve and transversely adjacent said inner lip edge when said sleeve is held against said sleeve contact.

20. The pitting plunger assembly of claim 19 wherein the fruit engaging end of said rod is formed with a peripheral edge having an inclined surface complementary to the bevelled fruit contact surface of said plunger sleeve, the peripheral end of said rod being located axially in back of the inner lip edge of said plunger sleeve when said sleeve is held against said sleeve contact.

21. The pitting plunger assembly of claim 18 wherein said plunger guide is formed with a tapered surface extending radially out and away from the fruit engaging end thereof.

22. An apparatus for pitting drupaceous fruit, a pitting plunger and a complementary pitting die, said die being formed with two pairs of diametrically opposed radial cuts, one pair perpendicular to the other; means for aligning and supporting a piece of drupaceous fruit between said die and plunger with the longitudinal axis of the pit substantially aligned with the center of said die, the major transverse diameter of said pit being aligned with one of said pairs of diametrically opposed die cuts; said means for aligning and supporting a piece of fruit comprising a pair of fruit engaging fingers, each finger being formed with a recess defined by substantially right angle contact surfaces, the recess of one finger being opposed to the recess of the other finger; means for bringing said fingers together to grip a piece of fruit transversely of the longitudinal pit axis; and means for moving said pitting plunger relative to said pitting die to effect a pitting of the fruit.

References Cited by the Examiner
UNITED STATES PATENTS

| | | | |
|---|---|---|---|
| 1,421,333 | 6/1922 | Wilcox | 146—19 |
| 1,725,224 | 8/1929 | Sturges | 146—237 |
| 1,810,954 | 6/1931 | Forrest | 146—17 |
| 2,254,594 | 9/1941 | Carroll | 198—33 |
| 2,407,126 | 9/1946 | Ashlock | 146—238 |
| 2,609,913 | 9/1952 | Doering et al. | 198—33 |
| 2,612,197 | 9/1952 | Giordano | 146—17 |

ROBERT C. RIORDON, *Primary Examiner.*

WILLIE G. ABERCROMBIE, *Examiner.*